US007809807B2

(12) United States Patent
Tominaga

(10) Patent No.: US 7,809,807 B2
(45) Date of Patent: Oct. 5, 2010

(54) IMAGE FORMING SYSTEM, IMAGE FORMING METHOD, AND SERVER

(75) Inventor: Masahiko Tominaga, Kanagawa (JP)

(73) Assignee: Canon Kabushiki Kaisha, Toyko (JP)

( * ) Notice: Subject to any disclaimer, the term of this patent is extended or adjusted under 35 U.S.C. 154(b) by 1086 days.

(21) Appl. No.: 10/214,096

(22) Filed: Aug. 8, 2002

(65) Prior Publication Data

US 2003/0033368 A1 Feb. 13, 2003

(30) Foreign Application Priority Data

Aug. 8, 2001 (JP) ............................. 2001-241261
Aug. 8, 2001 (JP) ............................. 2001-241357

(51) Int. Cl.
*G06F 15/177* (2006.01)
(52) U.S. Cl. ....................... 709/220; 709/203; 709/223; 358/1.1
(58) Field of Classification Search ......... 709/201–203, 709/220–221, 200, 223; 358/1.1
See application file for complete search history.

(56) References Cited

U.S. PATENT DOCUMENTS

| 5,553,242 | A | * | 9/1996 | Russell et al. ................ 709/227 |
| 5,751,923 | A | * | 5/1998 | Matsuzawa ................. 358/1.15 |
| 5,905,906 | A | * | 5/1999 | Goffinet et al. ................. 710/8 |
| 5,987,223 | A | * | 11/1999 | Narukawa et al. ............. 358/1.9 |
| 6,003,069 | A | * | 12/1999 | Cavill .......................... 709/205 |
| 6,112,256 | A | * | 8/2000 | Goffinet et al. ................ 710/8 |
| 6,205,476 | B1 | * | 3/2001 | Hayes, Jr. .................... 709/220 |
| 6,335,795 | B1 | * | 1/2002 | Neuhard et al. ............. 358/1.15 |
| 6,762,852 | B1 | * | 7/2004 | Fischer ....................... 358/1.15 |
| 6,809,831 | B1 | * | 10/2004 | Minari ....................... 358/1.15 |
| 6,914,987 | B2 | * | 7/2005 | Blind et al. .................... 381/13 |
| 7,155,534 | B1 | * | 12/2006 | Meseck et al. .............. 709/238 |
| 7,292,581 | B2 | * | 11/2007 | Finn ....................... 370/395.53 |
| 7,298,503 | B2 | * | 11/2007 | Christiansen et al. ...... 358/1.13 |
| 7,421,484 | B2 | * | 9/2008 | Das ............................. 709/220 |
| 7,676,563 | B2 | * | 3/2010 | Kothari et al. .............. 709/223 |
| 2002/0113989 | A1 | * | 8/2002 | Ferlitsch et al. ............. 358/1.15 |
| 2002/0174173 | A1 | * | 11/2002 | Gunturu ..................... 709/203 |

OTHER PUBLICATIONS

U.S. Appl. No. 09/855,586, filed May 16, 2001.

* cited by examiner

*Primary Examiner*—Faruk Hamza
(74) *Attorney, Agent, or Firm*—Fitzpatrick, Cella, Harper & Scinto

(57) ABSTRACT

In an image forming system which includes a plurality of image forming apparatuses, a server that manages the image forming apparatuses, and a client that issues a job request to the image forming apparatuses, the server has a memory for storing information which pertains to configurable functions of respective image forming apparatuses. When one of the server and client inputs a job to the image forming apparatus, and the input job is to be executed using a set of image forming apparatuses including a plurality of image forming apparatuses, a configuration required to execute the job is displayed on a display of the server or the client in association with respective image forming apparatuses in the set of image forming apparatuses on the basis of the information stored in the memory, thus allowing the user to configure functions in accordance with the display. In this way, the configurations and operations upon executing a single job using a plurality of image forming apparatuses can be facilitated.

6 Claims, 41 Drawing Sheets

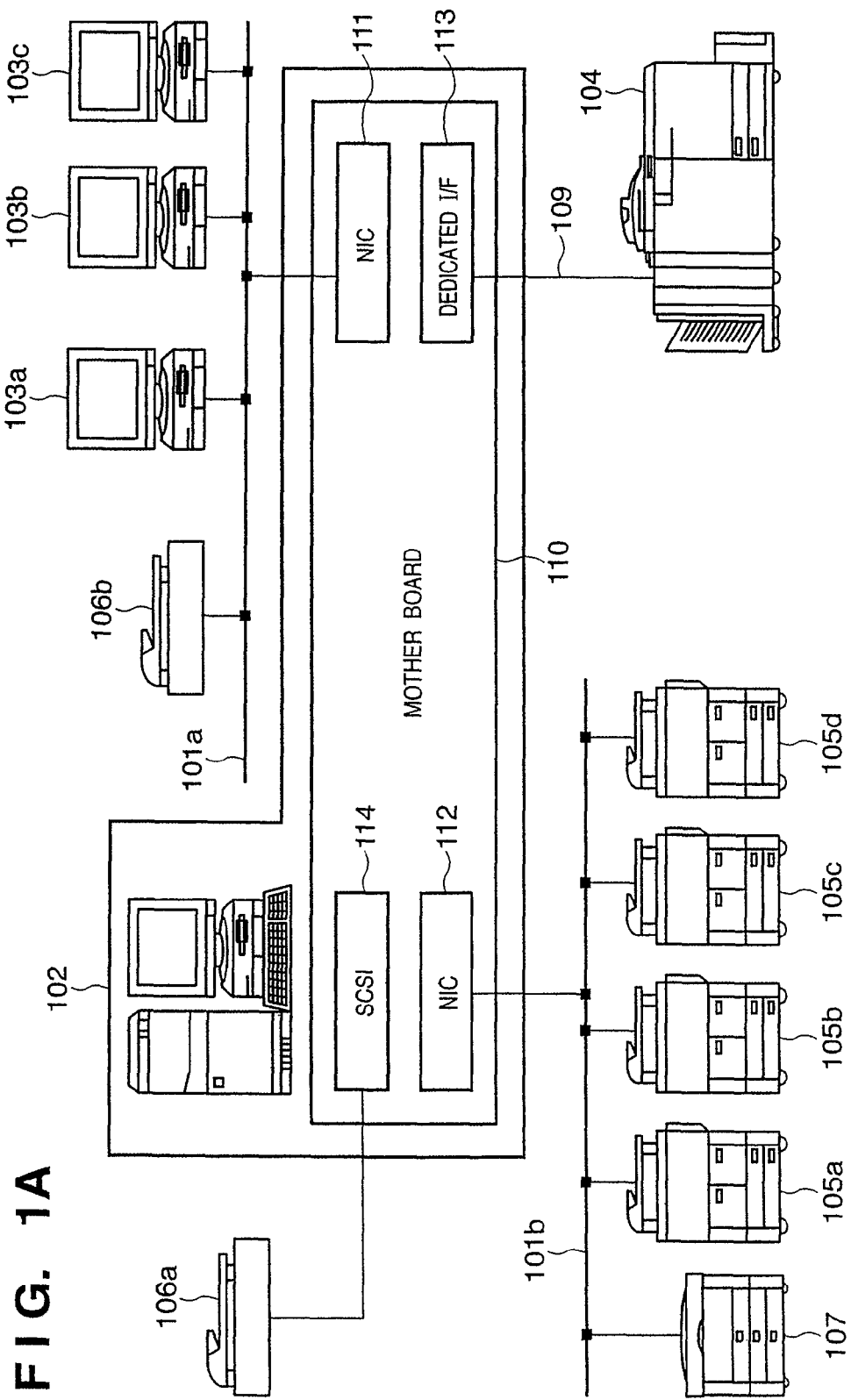

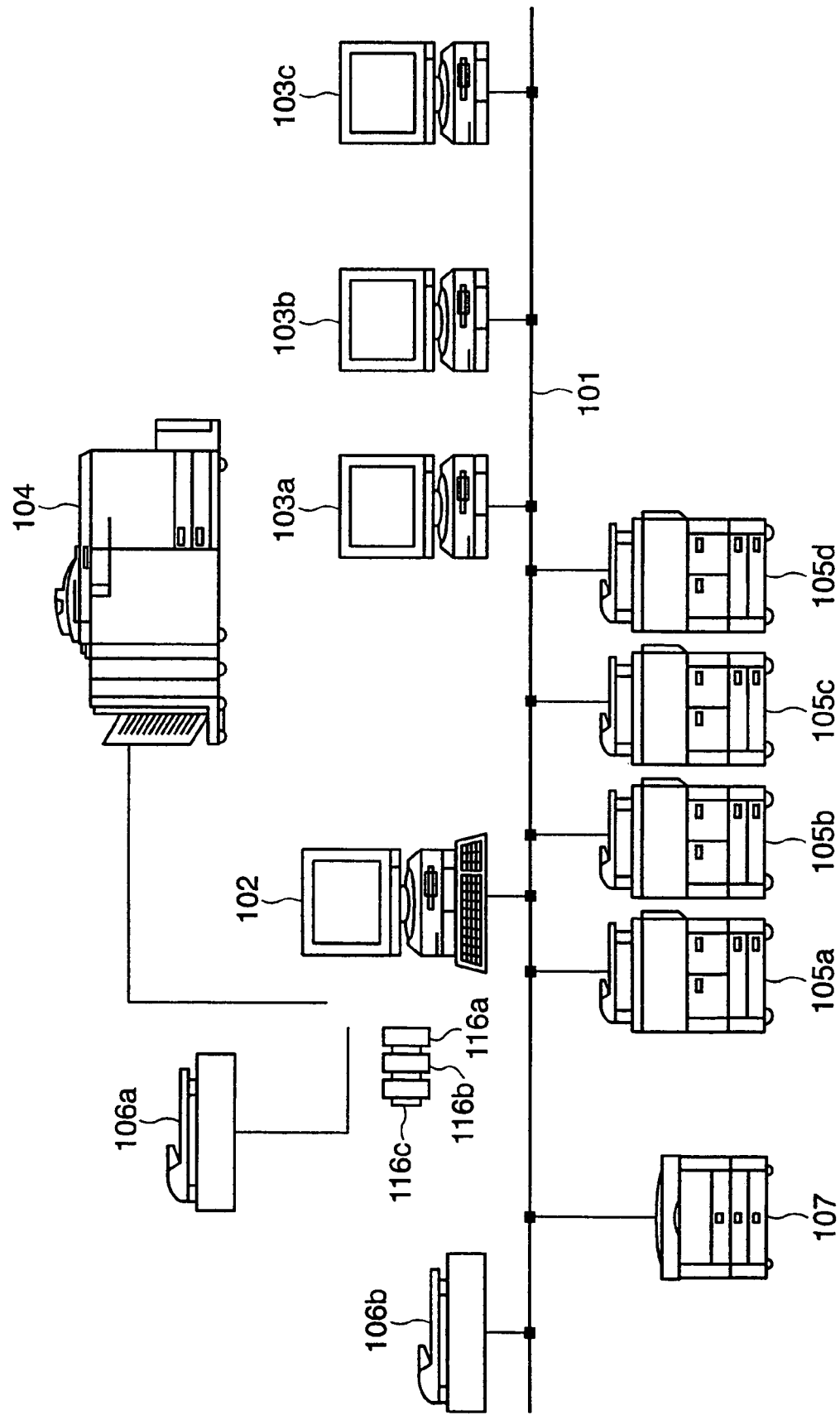

F I G. 3
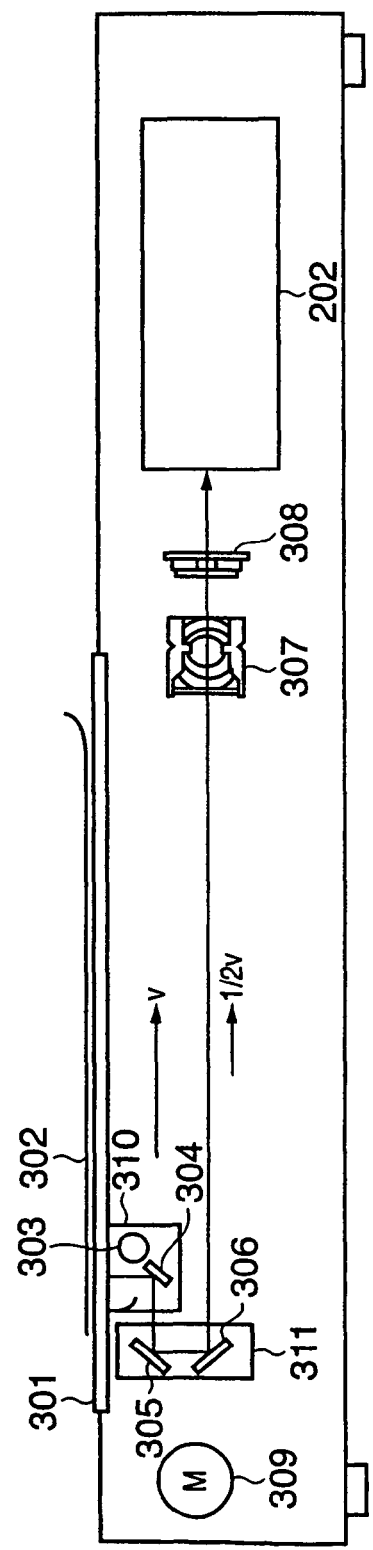

```
         DESCRIPTION OF R1301
         Char_color={0.0, 0.0, 0.0, 1.0};  ~L1311
L1312~ string1="IC";
         put_char(0.0, 0.0, 0.3, 0.1, string1) ~L1313

DESCRIPTION OF R1302
         line_color={1.0, 0.0, 0.0, 0.0};  ~L1321
         put_line(0.9, 0.0 ,0.9, 1.0, 0.1); ~L1322

DESCRIPTION OF R1303
         image1={CMYK, 8, 5, 5, C0, M0, Y0, K0,  ~L1331
                        C1, M1, Y1, K1
                           ⋮
                        C24, M24, Y24, K24};
         put_image(0.0, 0.5, 0.5, 0.5, image1); ~L1332
```

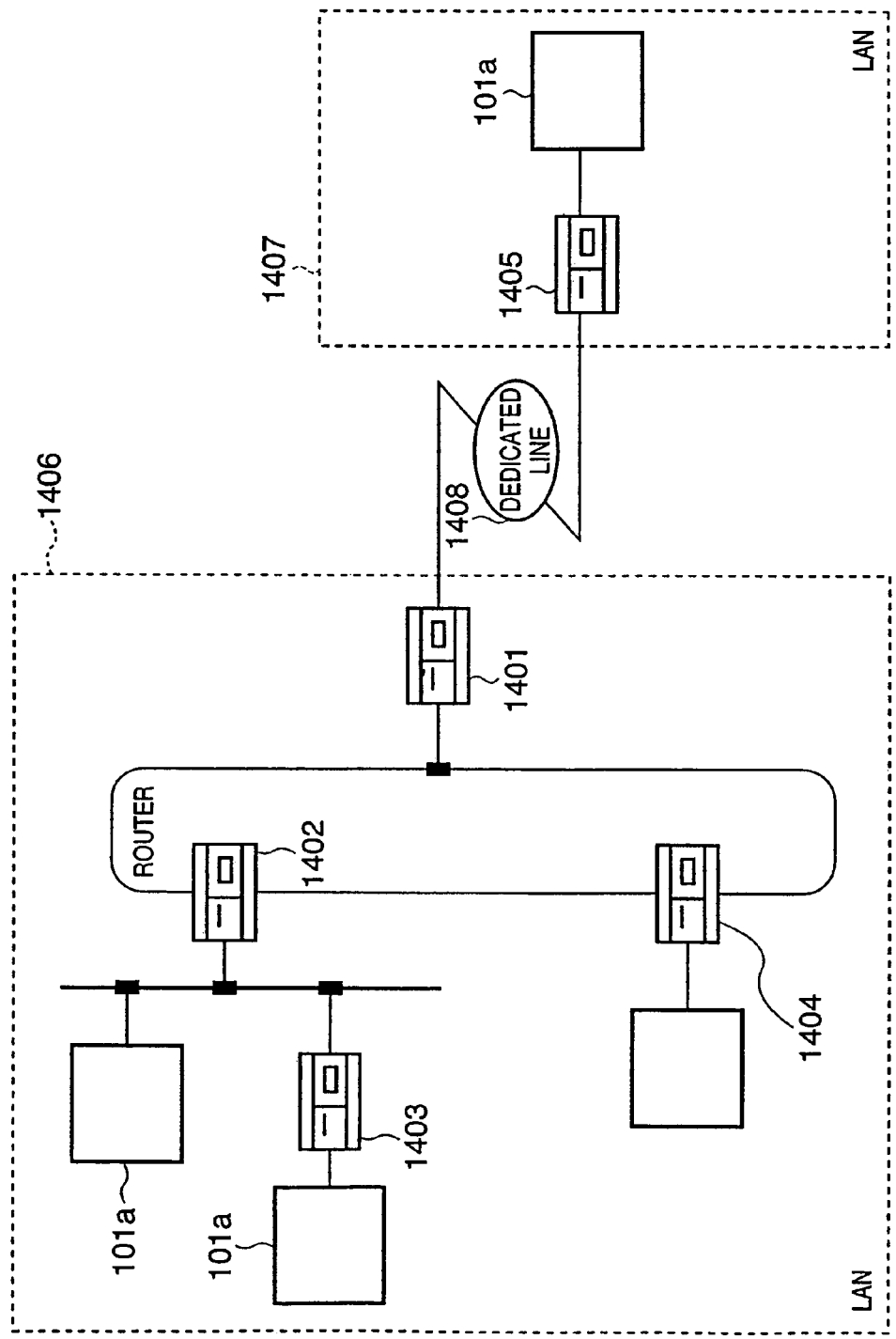

Job Status

Job Status

2302

| | Job Name | Status | Priority | Pages | Copies | Paper |
|---|---|---|---|---|---|---|
| 1 | File-6 | Ripping | High | 200 | 20 | Letter |
| 2 | File-7 | Ripping | Low | 120 | 30 | 11×17 |
| 3 | File-8 | Waiting | Medium | 300 | 15 | Letter |
| 4 | File-9 | Waiting | Medium | 20 | 350 | Letter |
| 5 | File-10 | Waiting | Medium | 155 | 10 | 11×17 |

Printing Status

2303

| | Job Name | Status | Printer | Pages | Copies | Paper |
|---|---|---|---|---|---|---|
| 1 | File-1 | Printing | 104-105c Cluster | 120 | 130 | Letter |
| 2 | File-2 | Printing | Printer 3 | 80 | 240 | Letter |
| 3 | File-3 | Waiting | Printer 1 | 230 | 15 | Letter |
| 4 | File-4 | Waiting | Printer 2 | 40 | 25 | 11×17 |
| 5 | File-5 | Waiting | Printer 3 | 35 | 10 | 11×17 |

History of finished job

2304

| | Job Name | Status | Job ID | Pages | Copies | Paper |
|---|---|---|---|---|---|---|
| 1 | File-E | Printing | #00122 | 110 | 30 | Letter |
| 2 | File-D | Canceled | #00121 | 25 | 20 | 11×17 |
| 3 | File-C | Printing | #00120 | 35 | 150 | Letter |
| 4 | File-B | Printing | #00119 | 110 | 40 | Letter |
| 5 | File-A | Canceled | #00118 | 240 | 35 | 11×17 |

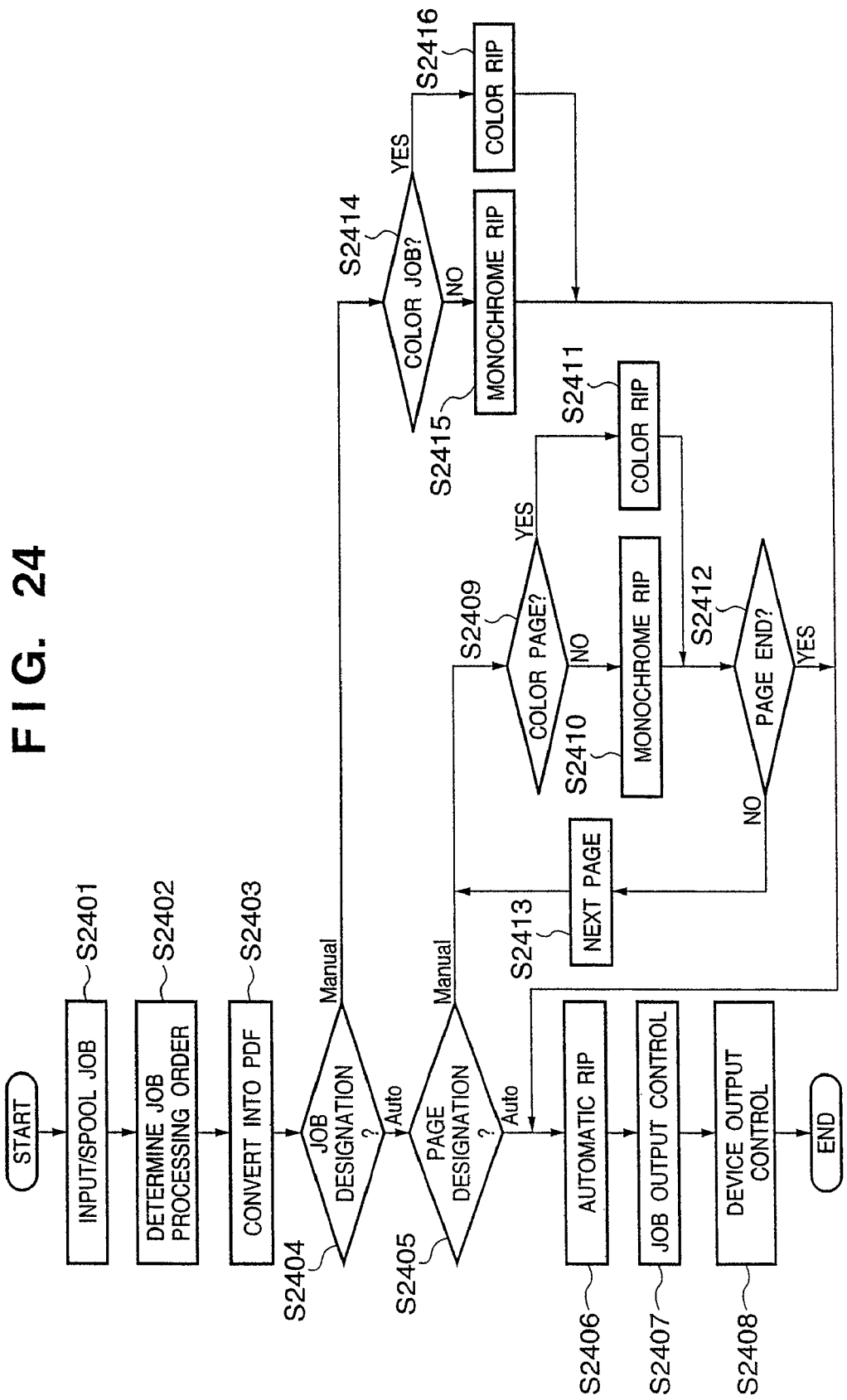

FIG. 25

1207 Disk

DEVICE UNIQUE INFORMATION FOR MFP 105

| PROPERTY | VALUE |
|---|---|
| Copies | 1-999 |
| Paper Size | Auto/A3/A4/A5/B4/B5/LTR/11×7/LGR/STMT |
| Paper Source | Auto/Tray1/Tray2/Tray3/Tray4/Stack Bypass |
| Duplex | Off/Long-Edge Bind/Short-Edge Bind |
| Job Priority | High/Midium/Low |
| Page Order | Forward/Reverse |
| Finisher Option | None/Finisher-A/Finisher-B |
| Staple | Off/Corner/Double |
| Punch | Off/On |
| Z-Fold | Off/On |
| Sorting | Off/Collate/Goup |

| DEVICE UNIQUE INFORMATION FOR MFP 104 | |
|---|---|
| PROPERTY | VALUE |
| Copies | 1-999 |
| Paper Size | Auto/A3/A4/A5/B4/B5/LTR/11×7/LGR/STMT |
| Paper Source | Auto/Paper Deck/Tray1/Tray2/Stack Bypass |
| Duplex | Off/Long-Edge Bind/Short-Edge Bind |
| Job Priority | High/Midium/Low |
| Page Order | Forward/Reverse |
| Finisher Option | None/Staple Sorter |
| Staple | Off/Cornor |
| Color | Normal/Gloss/Matte |
| Sorting | Off/Collate/Machanical Sort/Mechanical Group |

| DEVICE UNIQUE INFORMATION FOR MFP 105 | |
|---|---|
| PROPERTY | VALUE |
| Copies | 1-999 |
| Paper Size | Auto/A3/A4/A5/B4/B5/LTR/11×7/LGR/STMT |
| Paper Source | Auto/Tray1/Tray2/Tray3/Tray4/Stack Bypass |
| Duplex | Off/Long-Edge Bind/Short-Edge Bind |
| Job Priority | High/Midium/Low |
| Page Order | Forward/Reverse |
| Finisher Option | None/Finisher-A/Finisher-B |
| Staple | Off/Cornor/Double |
| Punch | Off/On |
| Z-Fold | Off/On |
| Sorting | Off/Collate/Goup |

| DEVICE UNIQUE INFORMATION FOR MFP 104 & 105 CLUSTER | |
|---|---|
| PROPERTY | VALUE |
| MFP104 : Copies | 1-999 |
| MFP104 : Paper Size | Auto/A3/A4/A5/B4/B5/LTR/11×7/LGR/STMT |
| MFP104 : Paper Source | Auto/Paper Deck/Tray1/Tray2/Stack Bypass |
| MFP104 : Duplex | Off/Long-Edge Bind/Short-Edge Bind |
| MFP104 : Job Priority | High/Midium/Low |
| MFP104 : Page Order | Forward/Reverse |
| MFP104 : Finisher Option | None/Staple Sorter |
| MFP104 : Staple | Off/Cornor |
| MFP104 : Color | Normal/Gloss/Matte |
| MFP104 : Sorting | Off/Collate/Machanical Sort/Mechanical Group |
| MFP105 : Copies | 1-999 |
| MFP105 : Paper Size | Auto/A3/A4/A5/B4/B5/LTR/11×7/LGR/STMT |
| MFP105 : Paper Source | Auto/Tray1/Tray2/Tray3/Tray4/Stack Bypass |
| MFP105 : Duplex | Off/Long-Edge Bind/Short-Edge Bind |
| MFP105 : Job Priority | High/Midium/Low |
| MFP105 : Page Order | Forward/Reverse |
| MFP105 : Finisher Option | None/Finisher-A/Finisher-B |
| MFP105 : Staple | Off/Corner/Double |
| MFP105 : Punch | Off/On |
| MFP105 : Z-Fold | Off/On |
| MFP105 : Sorting | Off/Collate/Goup |

FIG. 29

Job Ticket

104-105a Cluster

| | |
|---|---|
| MFP104 : Copies | 1 |
| MFP104 : Paper Size | A4 |
| MFP104 : Paper Source | Tray2 |
| MFP104 : Duplex | Long-Edge Bind ▶ |
| MFP104 : Job Priority | High ▶ |
| MFP104 : Page Order | Forward ▶ |
| MFP104 : Finisher Option | Staple Sorter ▶ |
| MFP104 : Staple | Corner ▶ |
| MFP104 : Color | Normal |
| MFP104 : Sorting | Mechanical Sort ▶ |

| | |
|---|---|
| MFP105a : Copies | 1 ▶ |
| MFP105a : Paper Size | A4 ▶ |
| MFP105a : Paper Source | Tray2 ▶ |
| MFP105a : Duplex | Long-Edge Bind ▶ |
| MFP105a : Job Priority | High ▶ |
| MFP105a : Page Order | Forward ▶ |
| MFP105a : Finisher Option | Finisher-B ▶ |
| MFP105a : Staple | Corner ▶ |
| MFP105a : Punch | Off ▶ |
| MFP105a : Z-Fold | Off |
| MFP105a : Sorting | Off |
| | Collate |
| | Group |

[ OK ]  [ Cancel ]

F I G. 35

| COMMON CONFIGURATION ITEM INFORMATION ||
|---|---|
| PROPERTY | VALUE |
| Copies | 1-999 |
| Paper Size | Auto/A3/A4/A5/B4/B5/LTR/11×7/LGR/STMT |
| Duplex | Off/Long-Edge Bind/Short-Edge Bind |
| Job Priority | High/Midium/Low |
| Page Order | Forward/Reverse |

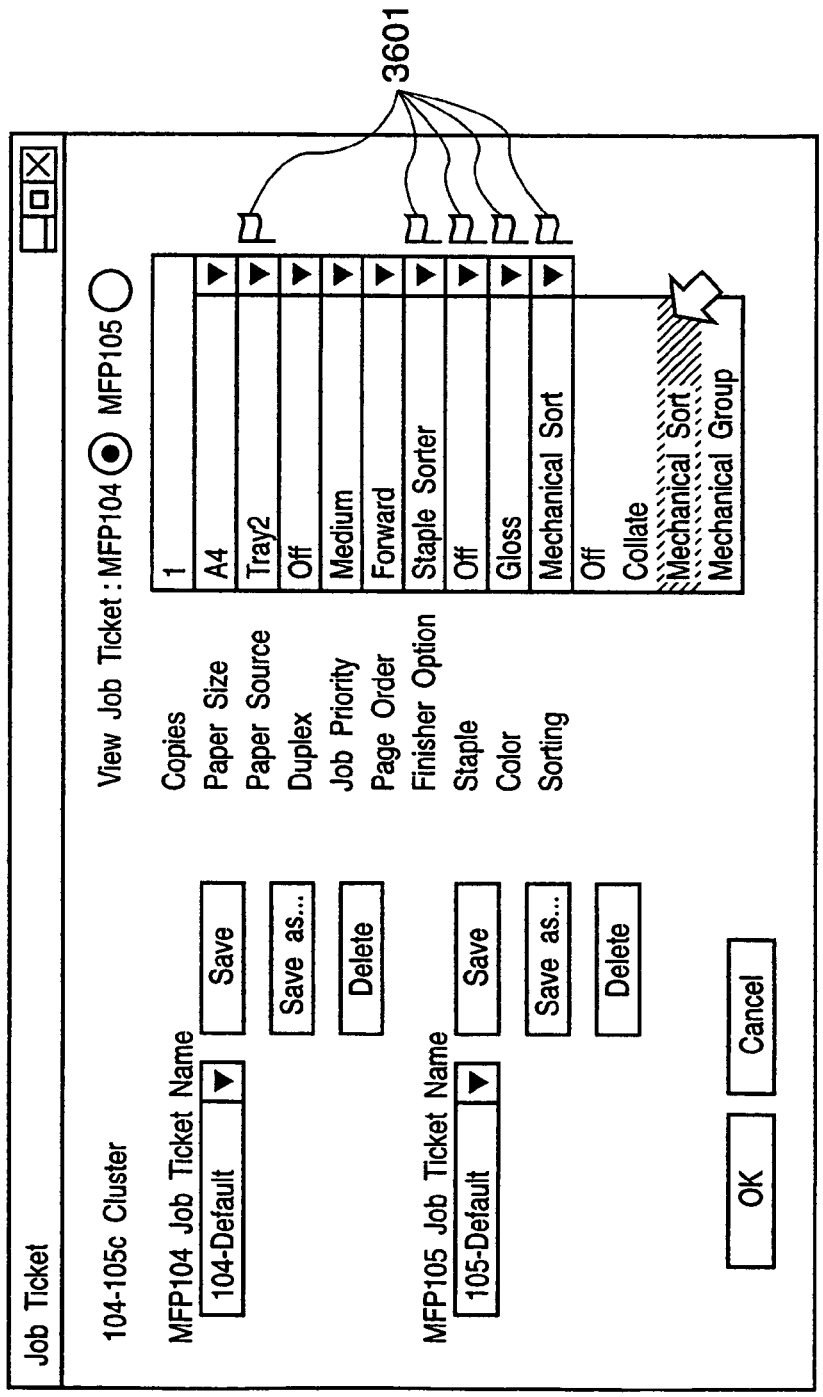

IMAGE FORMING SYSTEM, IMAGE FORMING METHOD, AND SERVER

FIELD OF THE INVENTION

The present invention relates to an image forming system, image forming method, and server and, more particularly, to a configuration method upon executing a job using a plurality of image forming apparatuses in an image forming system which includes a plurality of image forming apparatuses, a server that manages the image forming apparatuses, and a client that issues a job request to the image forming apparatuses.

BACKGROUND OF THE INVENTION

Conventionally, a single image forming apparatus such as a printer or the like is shared by a plurality of computers. In this case, the user selects a desired printer on his or her computer, and makes the selected printer execute a desired job via a versatile interface such as a LAN or the like or an interface using dedicated hardware.

Also, a system which is called a server-client system, and in which a job issued by a client user is sent to a printer via a controller server is well known.

In recent years, in a light print market called print-on-demand, the frequency of making an image forming apparatus execute a large number of jobs from a computer is on the rise, and a method of making the image forming apparatus efficiently execute a large number of jobs with low cost is demanded.

In order to efficiently execute jobs, a server having a high-end controller function that can process a large number jobs, and a plurality of image forming apparatuses connected to the server are indispensable in place of making one image forming apparatus execute one job especially, upon printing a large amount of data, a document server system which manages to split a single job into a plurality of print jobs, and control a plurality of image forming apparatuses to output them is used.

However, when a plurality of print jobs split from a single job are executed using a plurality of image forming apparatuses, the user must configure image processes to be executed by the image forming apparatuses, sheet feed trays, and finishing processes on a client. In such case, it is difficult to determine correspondence between respective configurations and image forming apparatuses, and the user must be familiar with the specifications and features of individual image forming apparatuses, or the names of respective units and the like. Hence, the user cannot easily make configurations.

As another method, desired configurations for individual image forming apparatuses may be prepared in advance, and upon outputting using a plurality of image forming apparatuses, configurations prepared for respective image forming apparatuses to be used may be selected. However, this method also requires troublesome operations.

Furthermore, when a plurality of print jobs split from a single job are executed using a plurality of image forming apparatuses, configurations in jobs such as an image processing method, destination tray, paper size, booklet imposition method (two-/one-sided print), and the like must be done for each individual image forming apparatus, but the paper size and booklet imposition method normally use identical configurations upon output. More specifically, when a plurality of image forming apparatuses as output destinations include different types of apparatuses such as color and monochrome image forming apparatuses, or have different finishing options (e.g., the number of exhaust trays attached), the user configures functions unique to each individual image forming apparatus such as a color/monochrome image processing method, designation of an exhaust tray, and the like. However, it is generally desirable to use common configurations such as a paper size, a two-sided print mode, and the like upon output.

For this reason, when the user instructs a plurality of image forming apparatuses to execute a single job, respective image forming apparatuses may output using different paper sizes or may form both one- and two-sided printouts, unless common functions of configurations for those image forming apparatuses are designated to have identical configurations. In such case, an output result that the user did not want may be obtained.

For this reason, in order to designate common functions to have identical configurations, the user must be familiar with configuration items which are these common functions.

In this way, when a single job is executed using a plurality of image forming apparatuses, the user must be familiar with configuration items of individual image forming apparatuses, and must designate items to be commonly configured to have identical configurations in all image forming apparatuses, so as to obtain a desired output result. Hence, the operations becomes complicated.

SUMMARY OF THE INVENTION

It is an object of the present invention to provide an image forming system, image forming method, and server, which can facilitate configurations and operations upon executing a single job using a plurality of image forming apparatuses.

It is another object of the present invention to provide an image forming system, image forming method, and server, which allow the user to easily identify items to be commonly configured of those configured for respective image forming apparatuses, upon executing a single job using a plurality of image forming apparatuses.

According to one aspect of the present invention, the above object is attained by an image forming system which includes a plurality of image forming apparatuses, a server that manages the image forming apparatuses, and a client that issues a job request to the image forming apparatuses, wherein: each of the server and the client comprises input means for inputting a job to the image forming apparatus, and display means, the server has storage means for storing information which pertains to configurable functions of respective image forming apparatuses, and the system comprises configuration display means for displaying a configuration and allowing a user to configure functions in accordance with the display when a job input from the input means of one of the server and the client is to be executed using a set of image forming apparatuses including a plurality of image forming apparatuses, the configuration being required to execute the job on the display means of the server or the client in association with respective image forming apparatuses in the set of image forming apparatuses on the basis of the information stored in the storage means.

That is, in an image forming system which includes a plurality of image forming apparatuses, a server that manages the image forming apparatuses, and a client that issues a job request to the image forming apparatus, the server has a storage means for storing information that pertains to available functions of respective image forming apparatuses. When a job is input from either the server or client to the image forming apparatuses, and that input job is to be executed using a set of image forming apparatuses including a plurality of image forming apparatuses, a configuration required to execute the job is displayed on a display means of the server or client as the job input source on the basis of the information stored in the storage means in association with respective image forming apparatuses in the set of image forming apparatuses, thus allowing the user to set functions according to the displayed contents.

In this manner, when the user instructs a plurality of image forming apparatuses to execute a single job, and configures functions such as image processes, sheet feed trays, finishing processes, and the like of the image forming apparatuses, he or she can easily determine correspondence between respective configuration items and image forming apparatuses on the basis of the displayed screen contents. Hence, the user can easily make configurations according to the displayed screen contents without the knowledge of the specifications and features of respective image forming apparatuses or the names of respective units and the like.

Unlike in the prior art in which configurations for respective image forming apparatuses are prepared in advance, and those for image forming apparatuses used are selected upon outputting using a plurality of image forming apparatuses, the user can arbitrarily make configurations for respective image forming apparatuses upon outputting using a plurality of image forming apparatuses, thus allowing simple operations without requiring any preparations or configurations.

Preferably, the configuration display means comprises determination means for determining if the set of image forming apparatuses include an image forming apparatus with a different function, and function information generation means for, when the determination means determines that an image forming apparatus with a different function is included, generating information which pertains to functions of the set of image forming apparatuses on the basis of information stored in the storage means.

It is preferable if the set of image forming apparatuses can be configured in advance, and display of the configuration display means is made upon configuring the set.

The plurality of image forming apparatuses and the client may be connected to said server via different routes.

The color and monochrome image forming apparatuses may be connected to the server via different routes.

Preferably, the functions include a function that pertains to a finishing process for output sheets.

According to another aspect of the present invention, another object is attained by an image forming system which includes a plurality of image forming apparatuses, a server that manages the image forming apparatuses, and a client that issues a job request to the image forming apparatuses, wherein: each of the server and the client comprises input means for inputting a job to the image forming apparatus, and display means, the server has storage means for storing information which pertains to an item to be commonly configured in a set of image forming apparatuses including a plurality of image forming apparatus upon executing a job using the set, of configurable items of respective image forming apparatuses, and the system comprises configuration display means for displaying items on the display means of the server or the client on the basis of the information stored in the storage means when a job input from the input means of one or the server and the client is to be executed using the set of image forming apparatuses, the items being required to be configured upon executing the job together with a mark used to identify if an item is to be commonly configured in the set.

That is, according to the present invention, in an image forming system which includes a plurality of image forming apparatuses, a server that manages the image forming apparatuses, and a client that issues a job request to the image forming apparatus, a storage means of the server stores information that pertains to items to be commonly configured in a set of image forming apparatuses of those which can be configured for respective image forming apparatuses, upon executing a job using the set of image forming apparatuses including a plurality of image forming apparatuses. When a job input from either the server or client is executed using the set of image forming apparatuses, items required to be configured to execute the job are displayed on a display means of the server or client as the job input source on the basis of the information stored in the storage means together with marks which are used to identify if those items are to be commonly configured in the set.

In this way, when the user instructs a plurality of image forming apparatuses to execute a single job, he or she can easily identify items such as the number of copies, paper size, and the like to be commonly configured in respective image forming apparatuses.

Hence, the user need not have specific knowledge of configuration items of respective image forming apparatuses and those to be commonly configured for a job, and can easily and reliably obtain a desired output result.

Preferably, the system further comprises modification reflection means for, when a configuration of the item to be commonly configured in the set is modified in accordance with display of the configuration display means, reflecting the modification in configurations for all the image forming apparatuses in the set.

It is preferable that the configuration display means additionally displays a specific mark in correspondence with the item to be commonly configured in the set.

Further, the configuration display means may additionally display specific marks in correspondence with items other than the item to be commonly configured in the set.

The plurality of image forming apparatuses and the client may be connected to the server via different routes.

The color and monochrome image forming apparatuses may be connected to the server via different routes.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1A is a schematic block diagram showing an image forming system according to an embodiment of the present invention;

FIG. 1B is a block diagram showing a conventional image forming system;

FIG. 3 is a sectional view showing the structure of a scanner unit shown in FIG. 2;

FIG. 14 is a diagram showing an example of the network arrangement in FIG. 1A;

FIG. 23 shows an example of a display window of job status;

FIG. 24 is a flow chart showing the operation when a given job include both color and monochrome images;

FIG. 25 is a table showing an example of device unique information;

FIGS. 28A to 28C are views for explaining a generation example of device unique information of a cluster;

FIG. 29 shows an example of a display window of a job ticket of a cluster;

FIG. 35 shows an example of common configuration item information; and

FIG. 36 shows another example of a job ticket window displayed on the MPF 104 upon implementing a cluster print process in the second embodiment.

DETAILED DESCRIPTION OF THE PREFERRED EMBODIMENTS

Figure 2:
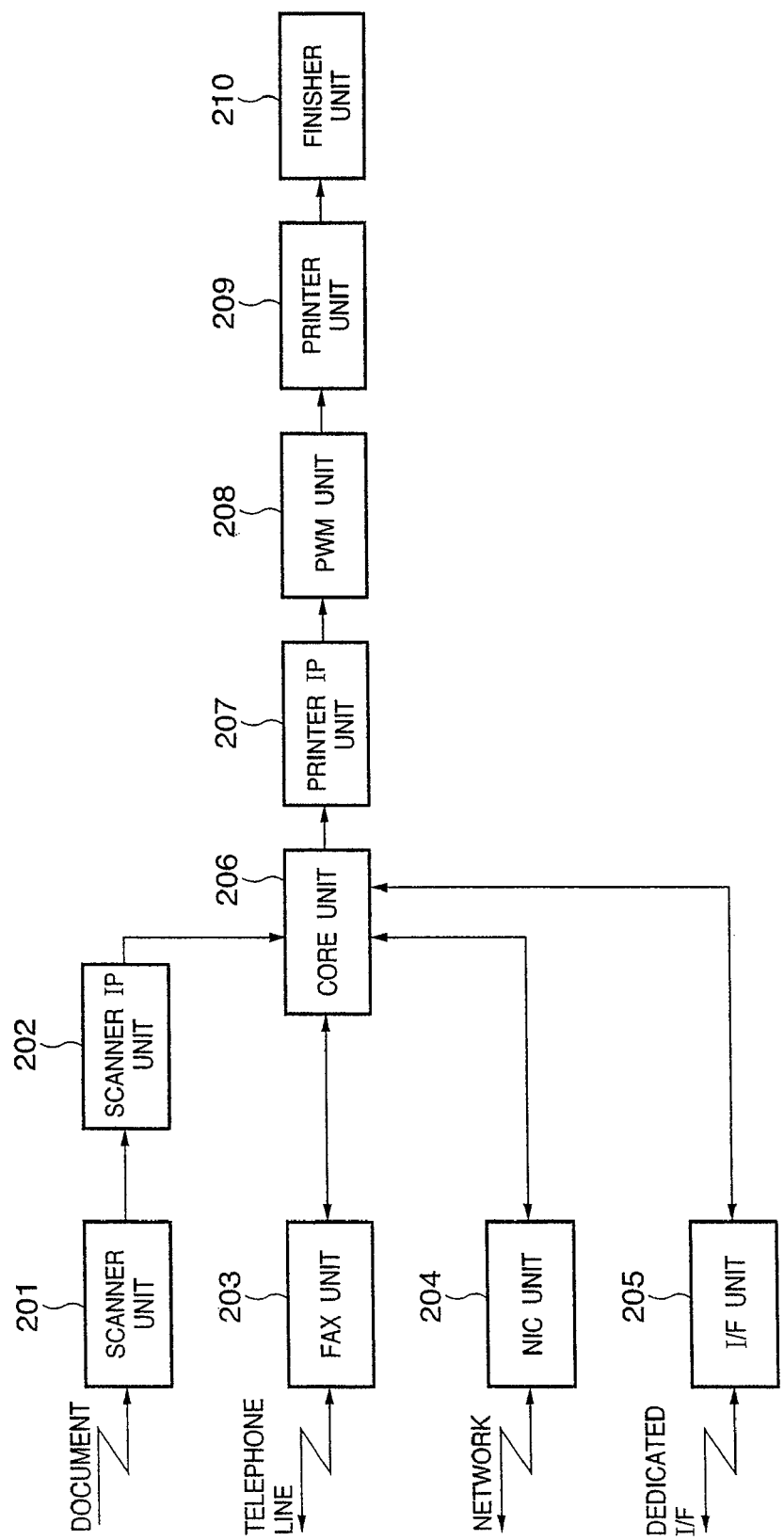
FIG. 2 is a block diagram showing the overall arrangement of an image forming apparatus.

Preferred embodiments of the present invention will now be described in derail in accordance with the accompanying drawings.

First Embodiment

Outline of System

FIG. 1A shows an outline of an image forming system according to the first embodiment of the present invention, and FIG. 1B shows a conventional image forming system for the purpose of comparison.

Either system has MPFs (Multi Function Peripherals) 104 and 105a to 105d, a printer 107, and scanners 106a and 106b as apparatuses which are used to input/output images, and clients 103a to 103c which send jobs to these apparatuses, and a document server 102 as a print control apparatus of the present invention are connected via a network 101.

In the conventional system shown in FIG. 1B, all apparatuses are connected to the single network 101. However, in this embodiment, the network 101 is divided into two systems, i.e., a public network 101a and private network 101b, at the document server 102 to prioritize performance, as shown in FIG. 1A.

For this purpose, the document server 102 has, as hardware on its mother board 110, two network interface cards (NICs) 111 and 112 compatible to the two network systems. The NIC 111 is connected to the public network 101a, and the NIC 112 is connected to the private network 101b.

The clients 103a to 103c are connected to the public network 110a. These terminals areas for example, personal computers. Many apparatuses may be connected as clients in addition to those apparatuses. These clients will be generally denoted by reference numeral 103.

On the other hand, the MFPs 105a to 105d and printer 107 are connected to the private network 110b Each of the MFPs 105a to 105d has monochrome scan/print functions, or low-resolution or binary simple color scan/print functions, and the like. Although not shown, other apparatuses such as MFPs, scanners, printers, facsimiles, and the like may be connected to the private network 101b in addition to the above apparatuses. Of these input apparatuses, the MFPs and printer will be generally referred to as print apparatuses. The document server 102 as the print control apparatus of the present invention generates a print job to be printed by these plurality of print apparatuses.

The MFP 104 is a full-color MFP which can implement high-resolution, multiple-tone, full-color scan and print processes. In this embodiment, the MFP 104 is connected to the document server 102 via a dedicated interface card 113. This is because the data size to be exchanged becomes huge, and the MFP 104 may be connected to the private network 101b.

The scanners 106a and 106b capture images recorded on sheet-like media such as paper sheets or the like. In this embodiment, there are two different types of scanners, i.e., the scanner 106b which is directly connected to the document server 102 via a SCSI interface, and the scanner 106a connected to the public network 101a (or to the private network 101b).

The hardware arrangement of the document server 102 will be described below. A circuit board called a mother board 110, on which a CPU, memory, and the like are mounted, has an interface called a PCI bus, to which the aforementioned NICs (Network Interface Cards) 111 and 112, the dedicated I/F card 113, a SCSI card 114, and the like are connected.

The user of each client 103 launches application software that implements so-called DTP (Desk Top Publishing) to create/edit various documents/figures. Each client 103 converts the created document/figure into a page description language (PDL), and sends the PDL data to the MFP 104 or 105 via the network 101a, thus obtaining printouts.

Each of the MFPs 104 and 105 has a communication means which can exchange information with the document server 102 via the network 101b or dedicated interface 109, and sends their information and status data to the document server 102 or each client 103 via the document server 102 as needed. Furthermore, the document server 102 (client 103) stores utility software that runs in response to such information, and the MFPs 104 and 10-5 are managed by the document server 102 (or client 103).

[Arrangement of MFPs 104 and 105]

The arrangement of the MFPs 104 and 105 will be described below using FIGS. 2 to 11. Note that the difference between the MFPs 104 and 105 is that between full-color and monochrome arrangements, and the arrangement of a full-color apparatus normally includes that of a monochrome apparatus except for a color process. Hence, the functions of the full-color apparatus 104 will be mainly explained below, and a description of the monochrome apparatus will be added as needed.

As shown in the block diagram of FIG. 2, each of the MFPs 104 and 105 has, as information input/output units, a scanner unit 201 for capturing an image, a scanner IP unit 202 for executing an image process of the captured image data, a FAX unit 203 (e.g., a facsimile) for sending/receiving images via a telephone line, an NIC unit 204 for exchanging image data and apparatus information via the network, and a dedicated I/F unit 205 for exchanging information with the document server 102 in case of the full-color MFP 104. A core unit 206 temporarily saves an image signal and determines a route in accordance with the operation mode of the MFP.

Image data output from the core unit 206 is sent to a printer unit 209 that forms an image via a printer IP unit 207 and PWM unit 208. Sheets printed out by the printer unit 209 are fed to a finisher unit 210 to undergo a sorting or finishing process.

[Arrangement of Scanner Unit 201]

The arrangement of the scanner unit 201 will be described below using FIG. 3. Reference numeral 301 denotes a platen glass on which a document 302 to be scanned is placed. The document 302 is irradiated with light emitted by an illumination lamp 303, and light reflected by the document 302 is focused by a lens 307 via mirrors 304, 305, and 306, thus forming an image on a CCD 308.

A first mirror unit 310 including the mirror 304 and illumination lamp 303 moves at given velocity v, and a second mirror unit 311 including the mirrors 305 and 306 moves at velocity ½ v, thus scanning the entire surface of the document 302. The first and second mirror units 310 and 311 are driven by a motor 309.

[Arrangement of Scanner IP Unit 202]

Figure 4A:
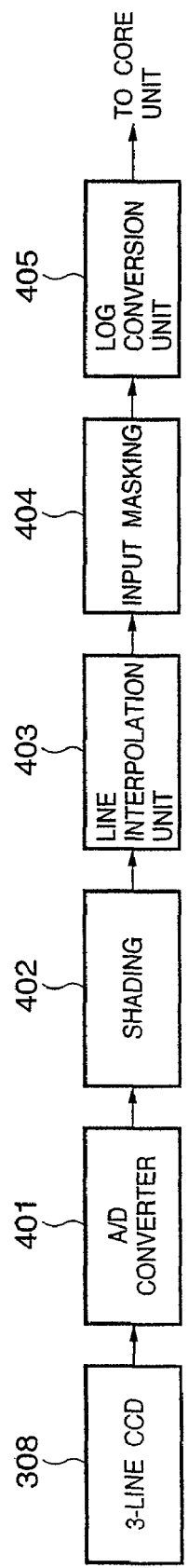
FIG. 4A is a block diagram showing the color arrangement of a scanner IP unit shown in FIG. 2.
Figure 4B:
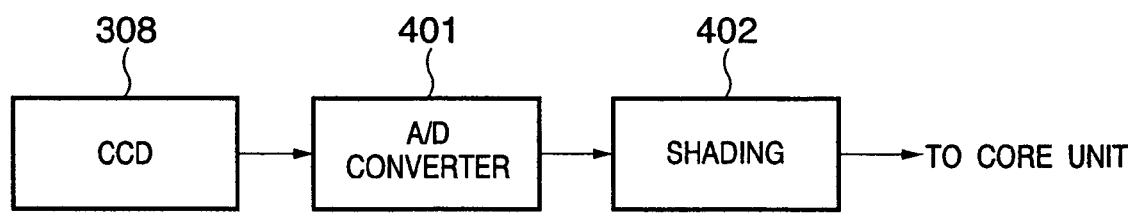
FIG. 4B is a block diagram showing the monochrome arrangement of the scanner IP unit shown in FIG. 2.

The arrangement of the scanner IP unit 202 will be described below using the block diagram of FIG. 4A. An input optical signal is converted into an electrical signal by the CCD sensor 308. The CCD sensor 308 comprises RGB 3-line color sensors, which input R, G, and B image signals to an A/D converter 401. After gain and offset adjustments, these image signals are converted into 8-bit digital image signals R0, G0, and B0. Each of the image signals R0, G0, and B0 then undergoes known shading correction using a signal obtained by scanning a reference white plate in a shading correction unit 402. Since the respective color line sensors of the CCD sensor 308 are laid out to be spaced a predetermined distance from each other, a spatial deviation in the sub-scan direction is corrected by a line delay adjustment circuit (line interpolation unit) 403.

An input masking unit 404 converts a color space of the scanned image, which is determined by spectral characteristics of R, G, and B filters of the CCD sensor 308, into an NTSC standard color space, and makes 3×3 matrix operations using constants unique to the apparatus in consideration of various characteristics such as sensitivity characteristics of the CCD sensor 308/spectral characteristics of the illumination lamp, thus converting the input signals (R0, G0, B0) into standard signals (R, G, B).

Furthermore, a luminance/density conversion unit (LOG conversion unit) 405 comprises a RAM which stores a lookup table (LUT), and converts R, G, and B luminance signals into C1, M1, and Y1 density signals.

Upon executing a monochrome image process by the MFP 105, a monochrome, 1-line CCD sensor 308 is used, and a monochrome signal undergoes A/D conversion (401) and shading (402). The processed signal is then supplied to the core unit 206.

[Arrangement of FAX Unit 203]

Figure 5:
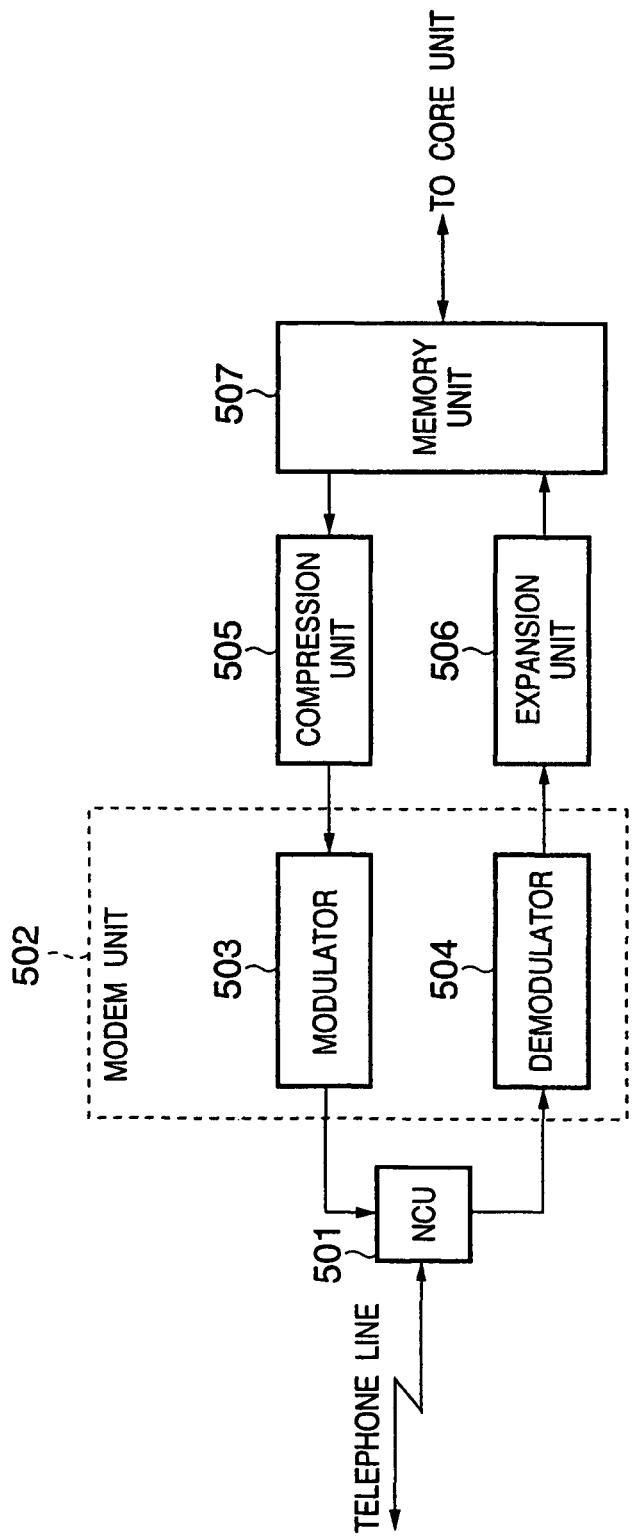
FIG. 5 is a block diagram showing the arrangement of a FAX unit shown in FIG. 2.

The arrangement of the FAX unit 203 will be described below using the block diagram of FIG. 5. Upon reception, data coming from the telephone line is received by an NCU unit 501 and undergoes voltage conversion. The converted data then undergoes A/D conversion and demodulation by a demodulator 504 in a modem unit 502. The demodulated data is then rasterized to raster data by an expansion unit 506. In general, compression/expansion in FAX uses a runlength method or the like. An image converted into raster data is temporarily saved in a memory unit 507, and is sent to the core unit 206 after it is confirmed that image data is free from any transfer errors.

Upon transmission, a raster image signal transferred from the core unit is compressed by a compression unit 505 using, e.g., a runlength method or the like, and the compressed data undergoes D/A conversion and modulation by a modulator 503 in the modem unit 502. The modulated data is then sent onto the telephone line via the NCU unit 501

[Arrangement of NIC Unit 204]

Figure 6A:
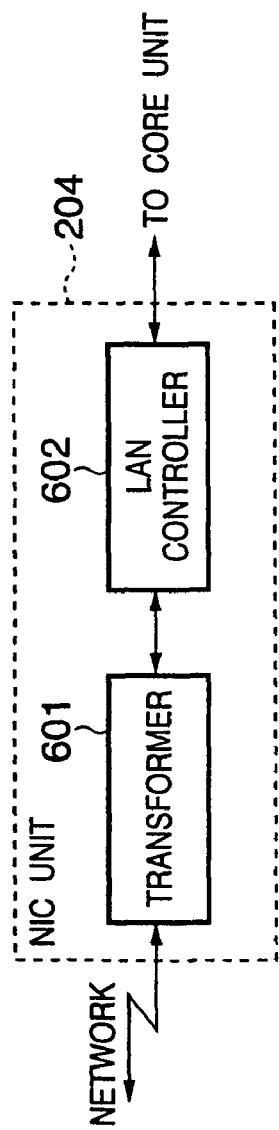
FIG. 6A is a block diagram showing the arrangement of an NIC unit shown in FIG. 2.

The arrangement of the NIC unit 204 will be described below using the block diagram of FIG. 6A. The NIC unit 204 has an interface function with the network 101, and serves to acquire information from an external apparatus and to output information to an external apparatus using an Ethernet cable or the like that complies with 10Base-T/100Base-TX or the like.

Upon acquiring information from an external apparatus, input data undergoes voltage conversion by a transformer 601, and is then sent to a LAN controller 602. The LAN controller 602 includes a first buffer memory (not shown), which is used to check if that information is required, and then transfers the information to a second buffer memory (not shown) if that information is required. After that, the LAN controller 602 transfers a signal to the core unit 206.

Upon providing information to an external apparatus, data sent from the core unit 206 is appended with required information by the LAN controller 602, and is then output onto the network 101 via the transformer 601.

[Arrangement of Dedicated I/F Unit 205]

The dedicated I/F unit 205 serves as an interface of the full-color MFP 104, and comprises image data and communication lines for 4 colors×8 bits, which can parallelly send C, M, Y, and K multi-valued bit signals.

As in other MFPs, communications using an Ethernet cable may be used. However, in this case, since data must be output at a speed (transfer rate) that matches the processing performance of the MFP 104, and the data size may adversely influence the performance of other devices connected to the network, such dedicated parallel interface is used.

[Arrangement of Core Unit 206]

Figure 6B:
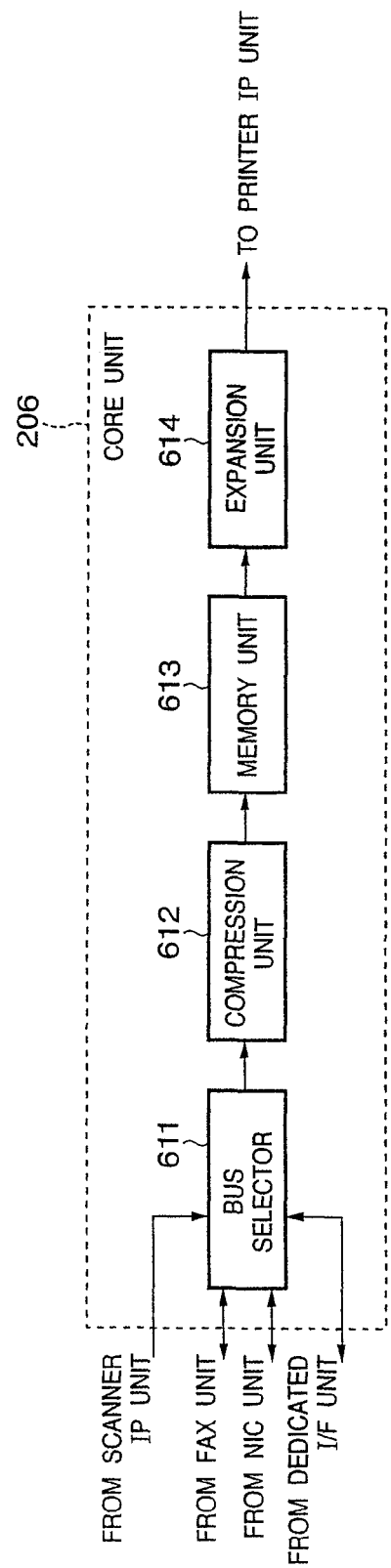
FIG. 6B is a block diagram showing the arrangement of a core unit shown in FIG. 2.

The arrangement of the core unit 206 will be described below using the block diagram of FIG. 6B. A bus selector 611 of the core unit 206 provides a so-called traffic control function upon using the MFPs 104 and 105. That is, the bus selector 611 switches buses in accordance with various functions of the MFPs 104 and 105 such as a copying function, network scan function, network print function, facsimile transmission/reception function, display function, and the like.

Path switching patterns for implementing respective functions are as follows.

Copying function: scanner 201→core 206→printer 209
Network scan: scanner 201→core 206→NIC unit 204
Network print: NIC unit 204→core 206→printer 209
Facsimile transmission function: scanner 201→core 206→FAX unit 203
Facsimile reception function: FAX unit 203→core 206→printer 209

Image data output from the bus selector 611 is sent to the printer IP unit 207 via a compression unit 612, a memory unit 613 comprising a large-capacity memory such as a hard disk (HDD) or the like, and an expansion unit 614. As a compression scheme used in the compression unit 612, a general scheme such as JPEG, JBIG, ZIP, or the like may be used. The compressed image data is managed for each job (processing request), and is stored together with additional data such as a file name, creator, date of creation, file size, and the like.

Furthermore, if a number and password are assigned to each job as a processing request and are stored together, a personal box function can be supported. This function allows only a specific user to temporarily save or print out data (read out data from the HDD). Upon designating a printout instruction of a stored job, that job is read out from the memory unit 613 after password authentication, and image data is expanded to a raster image, which is sent to the printer IP unit 207.

[Arrangement of Printer IP Unit 207]

Figure 7A:
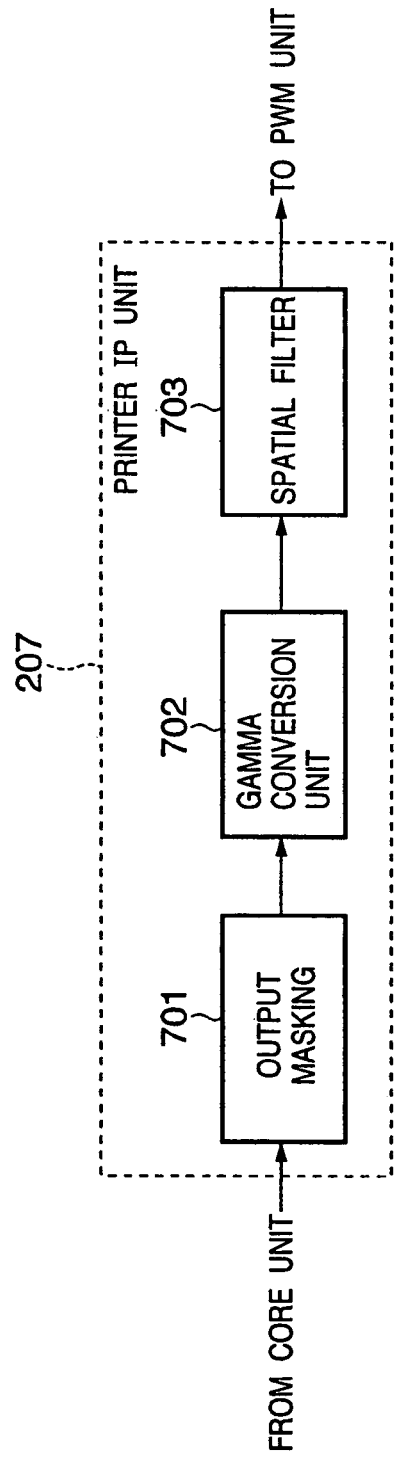
FIG. 7A is a block diagram showing the color arrangement of a printer IP unit shown in FIG. 2.

The arrangement of the printer IP unit 207 will be explained below using FIG. 7A. An output masking/UCR circuit unit 701 converts M1, C1, and Y1 signals into Y, M, C, and K signals as toner colors of an image forming apparatus using matrix operations. The unit 701 corrects C1, M1, Y1, and K1 signals based on R, G, and B signals captured by the CCD sensor 308 to C, M, Y, and K signals based on the spectral distribution characteristics of toners, thus outputting the corrected signals.

A gamma conversion unit 702 converts the C, M, Y, and K signals into C, M, Y, and K data for image output using a lookup table (LUT) RAM that considers various tincture characteristics of toners, and a spatial filter 703 executes sharpness or smoothing correction of the C, M, Y, and K data. After that, the image signals are sent to the core unit 206.

Figure 7B:
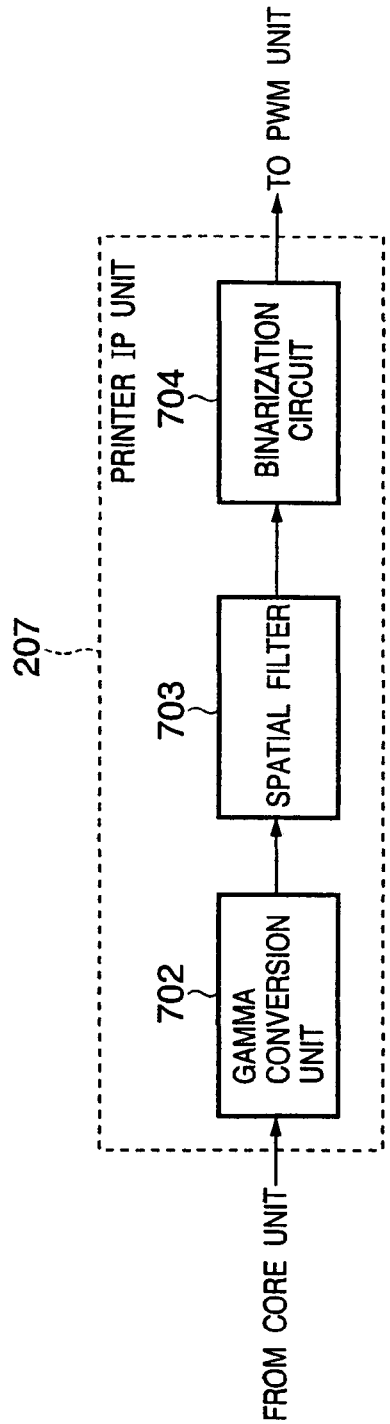
FIG. 7B is a block diagram showing the monochrome arrangement of the printer IP unit shown in FIG. 2.

Note that the monochrome MFP 105 has no output masking/UCR circuit unit 701, and a binarization circuit 704 is inserted after the spatial filter 703, as shown in the block diagram of FIG. 7B. Hence, an image signal is sent as monochrome data to the core unit 206.

[Arrangement of PWM Unit 208]

Figure 8A:
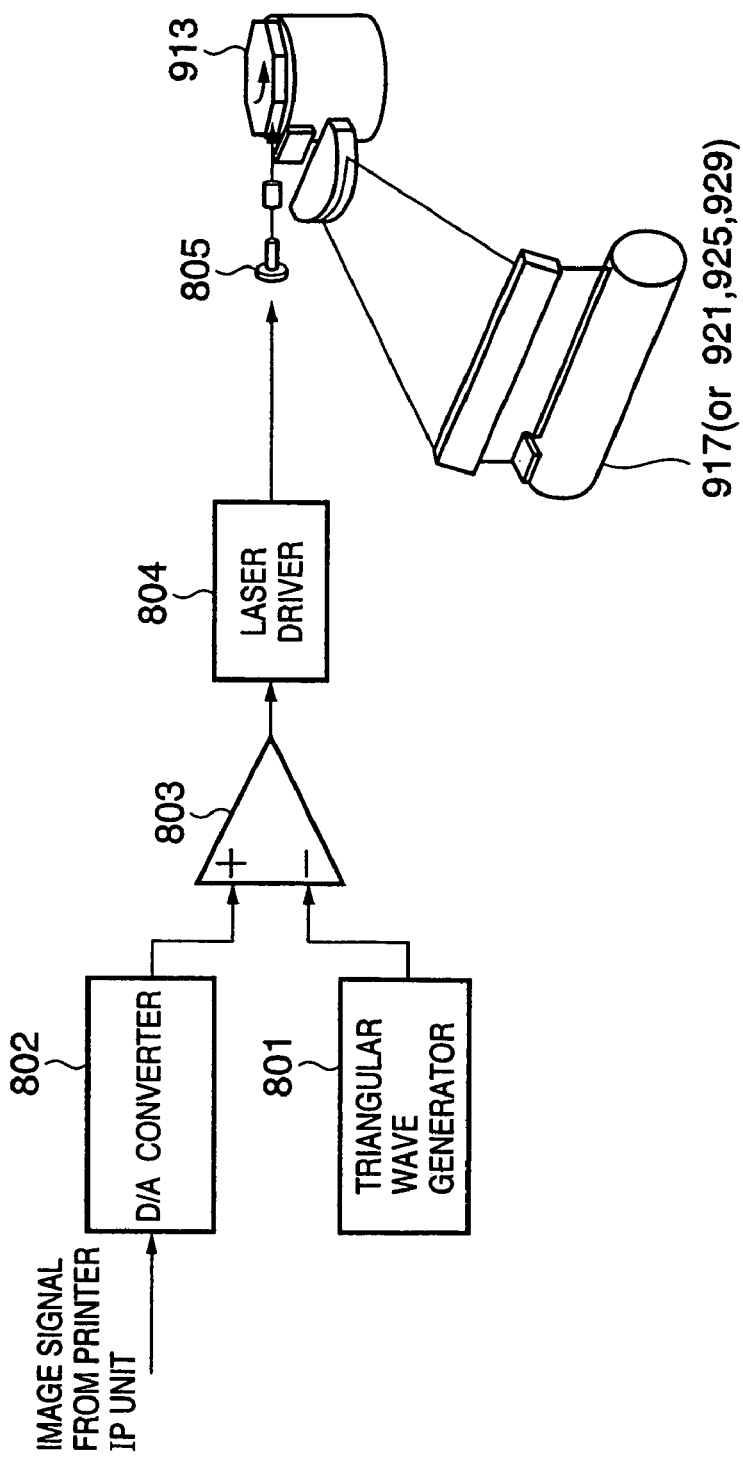
FIG. 8A is a block diagram showing the arrangement of a PWM unit shown in FIG. 2.
Figure 8B:
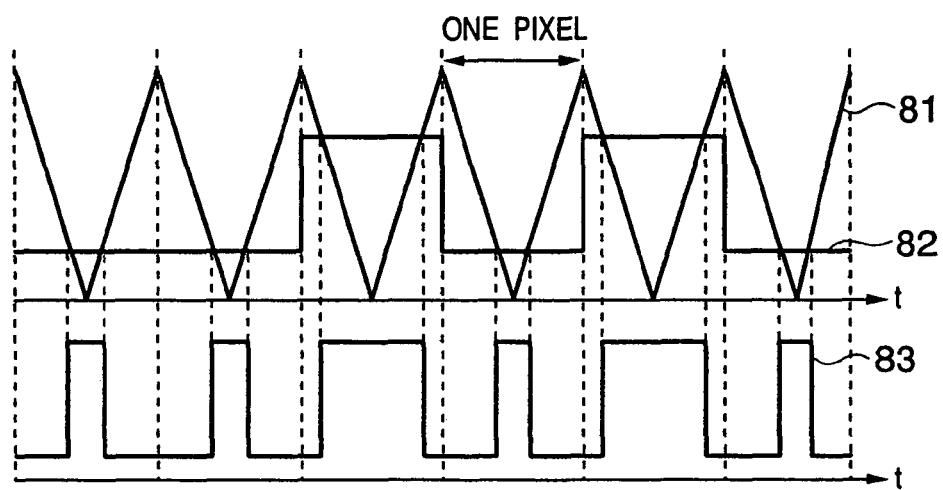
FIG. 8B is a graph showing signal waveforms in respective units in FIG. 8A.

The arrangement of the PWM unit 208 will be described below using the block diagram of FIG. 8A and the graph showing the signal waveforms in FIG. 8B. Image data which are output from the printer IP unit 207 and have been color-separated into four colors, i.e., yellow (Y), magenta (M), cyan (C), and black (K) (monochrome image data in case of the monochrome MFP 105) undergo image formation via corresponding PWM units 208.

Reference numeral 801 denotes a triangle wave generator; and 802, a D/A converter for converting an input digital image signal into an analog signal. A comparator 803 compares an output signal (81 in FIG. 8B) from the triangular wave generator 801, and an output signal (82 in FIG. 8B) from the D/A converter 802 to obtain a signal, as indicated by 83 in FIG. 8B. The obtained signal is sent to a laser driver 804, and is converted into a laser beam by a laser 805 corresponding to each of C, M, Y, and K.

A polygonal scanner 913 scans each laser beam to irradiate a corresponding one of photosensitive drums 917, 921, 925, and 929 with the laser beam, thus forming a latent image on that drum.

[Arrangement of Printer Unit 209 (Color MFP 104)]

Figure 9:
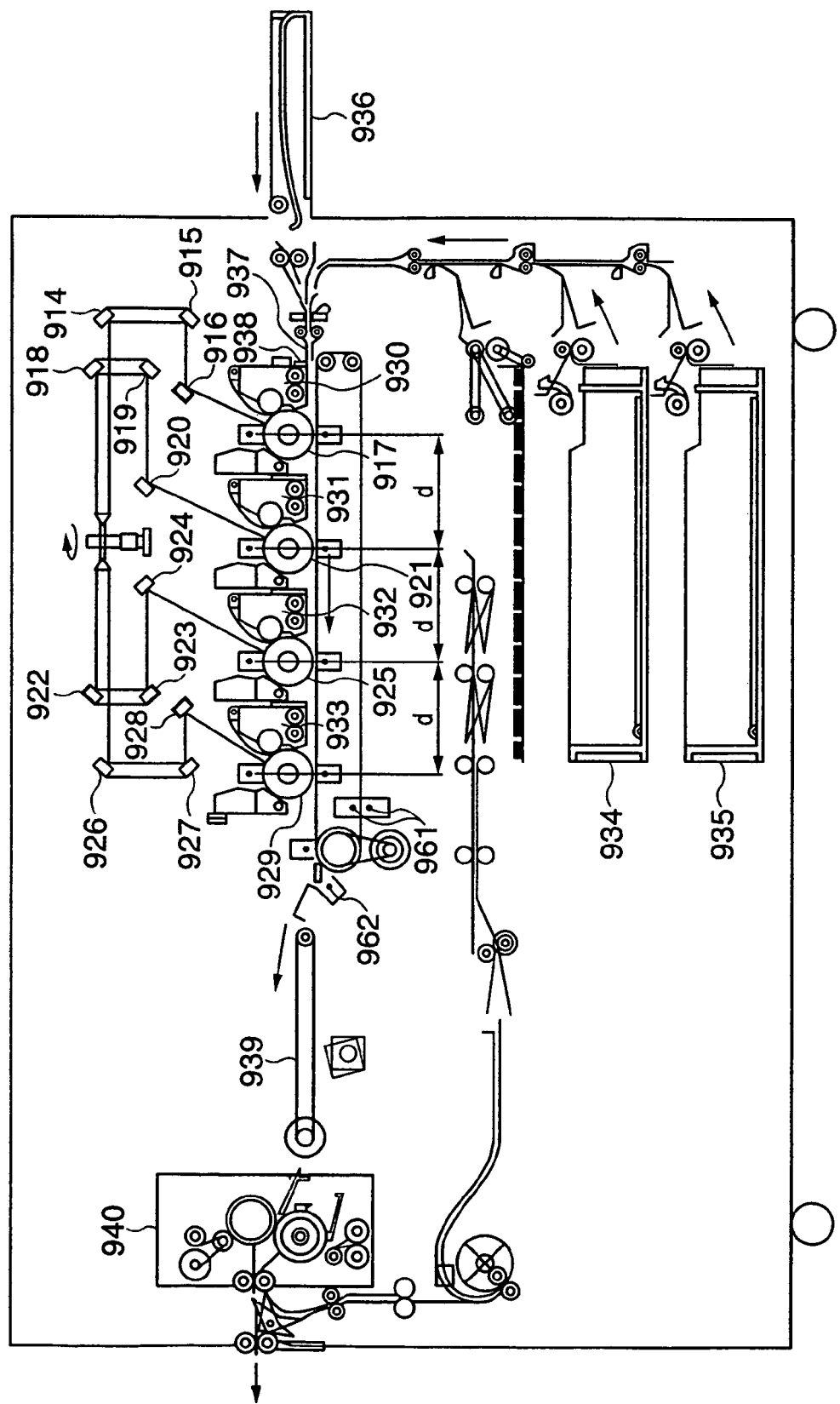
FIG. 9 is a side perspective view of a printer unit of a color image forming apparatus.

FIG. 9 is a side perspective view showing a schematic structure of a color printer unit. Reference numeral 913 denotes a polygonal mirror, which receives four laser beams which are emitted by four semiconductor lasers 805 and correspond to C, M, Y, and K images. One of these laser beams scans the photosensitive drum 917 via mirrors 914, 915, and 916, the next laser beam scans the photosensitive drum 921 via mirrors 918, 919, and 920, the second next laser beam scans the photosensitive drum 925 via mirrors 922, 923, and 924, and the third next laser beam scans the photosensitive drum 929 via mirrors 926, 927, and 928.

Reference numeral 930 denotes a developer which supplies yellow (Y) toner to form a yellow toner image on the photosensitive drum 917 in accordance with the laser beam; 931, a developer which supplies magenta (M) toner to form a magenta toner image on the photosensitive drum 921 in accordance with the laser beam; 932, a developer which supplies cyan (C) toner to form a cyan toner image on the photosensitive drum 925 in accordance with the laser beam; and 933, a developer which supplies black (K) toner to form a black toner image on the photosensitive drum 929 in accordance with the laser beam. These four color (Y, M, C, and K) toner images are transferred onto a sheet, thus obtaining a full-color output image.

A sheet fed from one of sheet cassettes 934 and 935 and a manual insert tray 936 is conveyed while being attracted on a transfer belt 938 via registration rollers 937. Respective color toner images are formed in advance on the photosensitive drums 917, 921, 925, and 929 in synchronism with the sheet feed timing, and are transferred onto the sheet as the sheet is conveyed. The sheet on which the toner images have been transferred is separated, and is conveyed by a conveyor belt 939 to a fixing unit 940, which fixes the toner images on the sheet. The sheet that has passed through the fixing unit 940 is temporarily guided downward by a flapper 950. After the trailing end of the sheet has passed by the flapper 950, the sheet is switched back, and is exhausted. In this manner, the sheet is exhausted facing down, and a correct page order is obtained if a print process is done in turn from the first page.

Note that the four photosensitive drums 917, 921, 925, and 929 are spaced an equal distance d, the sheet is conveyed at constant velocity v by the conveyor belt 939, and the four semiconductor lasers 805 are driven in synchronism with this convey timing.

[Arrangement of Printer Unit 209 (Monochrome MFP 105)]

Figure 10:
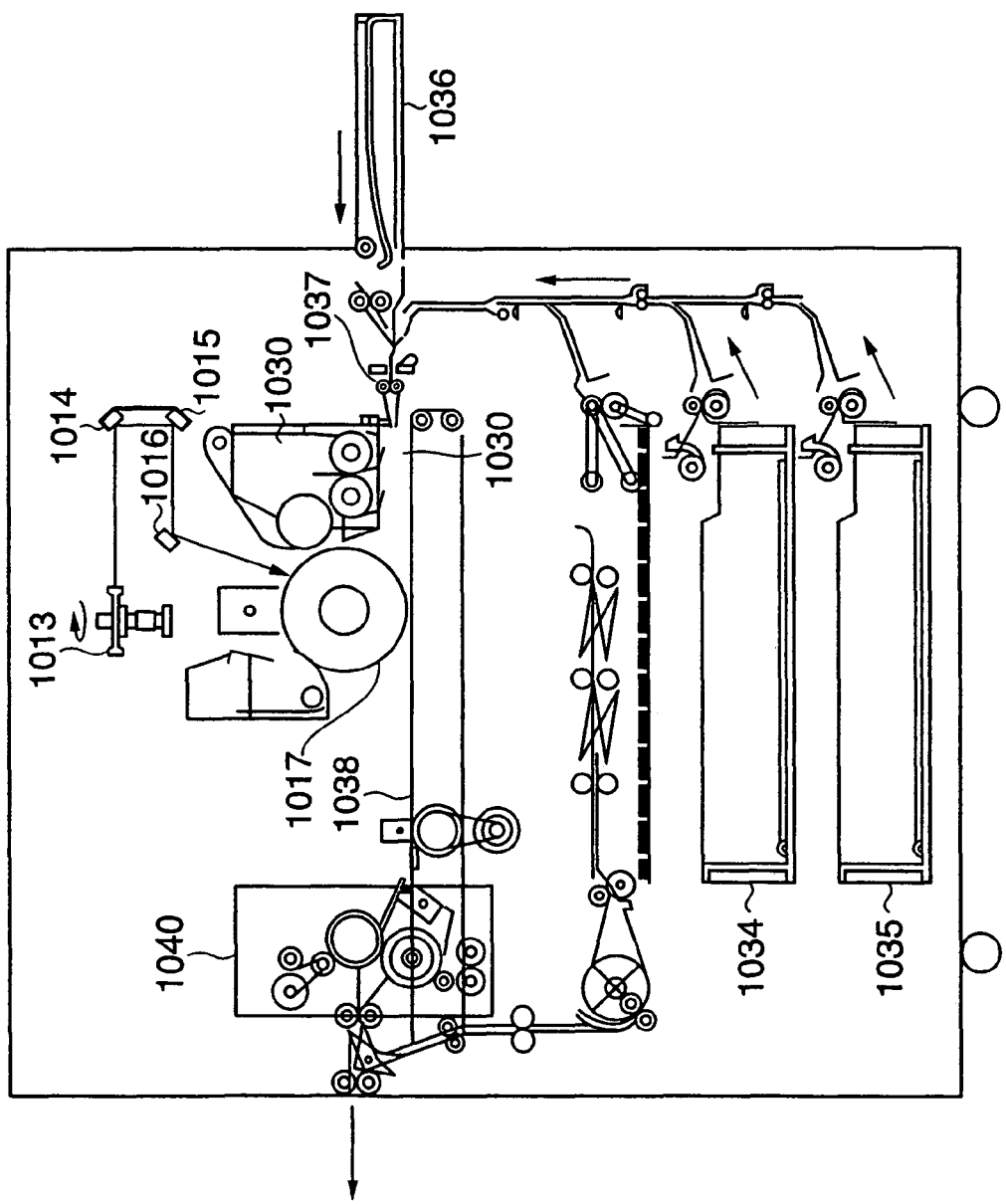
FIG. 10 is a side perspective view of a printer unit of a monochrome image forming apparatus.

FIG. 10 is a schematic side perspective view showing the arrangement of a monochrome printer unit. Reference numeral 1013 denotes a polygonal mirror, which receives a laser beam emitted by a semiconductor laser 805. The laser beam scans a photosensitive drum 1017 via mirrors 1014, 1015, and 1016. On the other hand, reference numeral 1030 denotes a developer which supplies black toner to form a toner image on the photosensitive drum 1017 in accordance with the laser beam. The toner image is transferred onto a sheet, thus obtaining an output image.

A sheet fed from one of sheet cassettes 1034 and 1035 and a manual insert tray 1036 is conveyed while being attracted on a transfer belt 1038 via registration rollers 1037. A toner image is formed in advance on the photosensitive drum 1017 in synchronism with the sheet feed timing, and is transferred onto the sheet as the sheet is conveyed. The sheet on which the toner image has been transferred is separated, and is conveyed to a fixing unit 1040, which fixes the toner image on the sheet. The sheet that has passed through the fixing unit 1040 is temporarily guided downward by a flapper 1050. After the trailing end of the sheet has passed by the flapper 1050, the sheet is switched back, and is exhausted. In this manner, the sheet is exhausted facing down, and a correct page order is obtained if a print process is done in turn from the first page.

[Arrangement of Finisher Unit 209]

Figure 11:
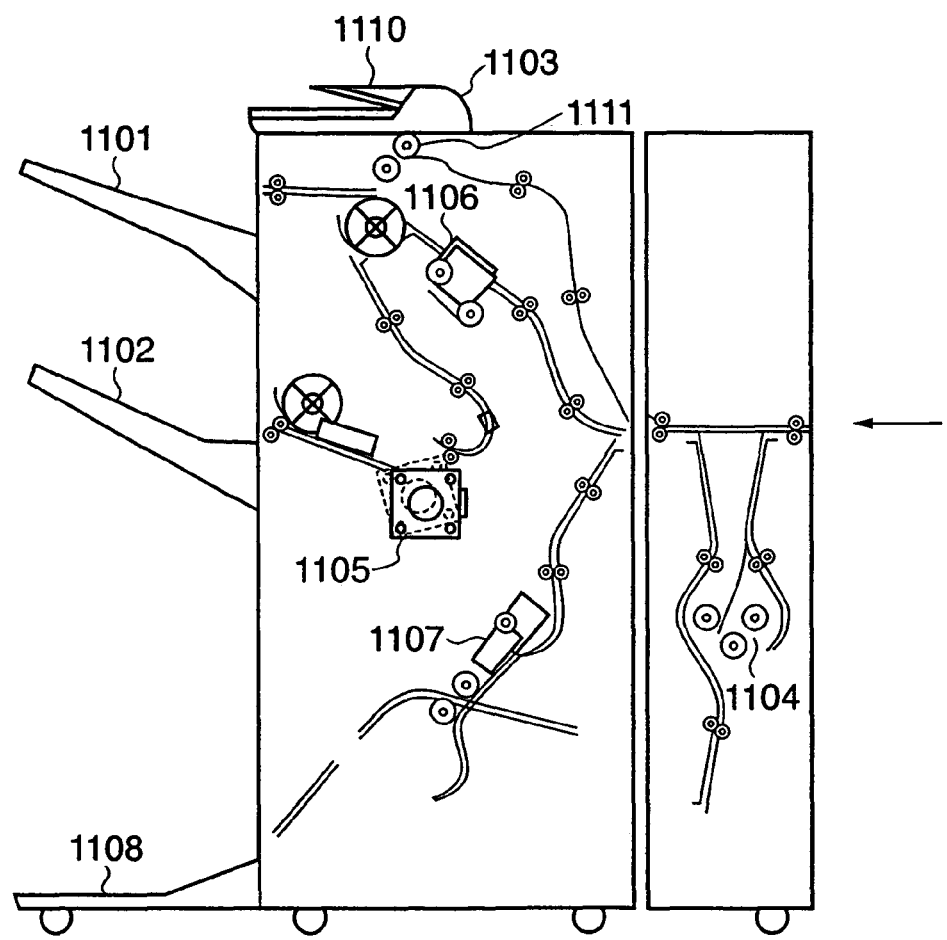
FIG. 11 is a side view showing the arrangement of a finisher unit of an image forming apparatus.

FIG. 11 is a schematic side perspective view showing the arrangement of the finisher unit. A sheet exhausted from the fixing unit 940 (or 1040) of the printer unit 209 enters the finisher unit 209. The finisher unit 209 has a sample tray 1101 and stack tray 1102, on which sheets are selectively exhausted in correspondence with the type of job and the number of sheets to be exhausted.

There are two types of sort methods: a bin sort method for sorting sheets on a plurality of bins, and a shift sort method for sorting output sheets for respective jobs using a digital sort function (to be described below) by shifting a bin (tray) to the closer/farther side. The digital sort function is called a collate function. If the apparatus has a large-capacity memory described in the paragraphs of the core unit, a digital sorting function can be supported using a so-called collate function of changing the order in which pages are exhausted to be different from that in which they are buffered in the buffer memory. A group function sorts output sheets for respective pages in place of jobs unlike in the sorting function.

Furthermore, when sheets are to be exhausted onto the stack tray 1102, sheets which are about to be exhausted can be stored and bound for each job by a stapler 1105.

Before reaching the above two trays, a Z-fold machine 1104 for folding sheets in a Z-shape, and a puncher 1106 for punching two (or three) holes for filing are available, and respective processes are done in accordance with the types of jobs.

Furthermore, a saddle stitcher 1107 executes a process for holding sheets in half by binding two central portions of sheets and biting the central portion of the sheets by rollers so as to form a booklet such as a weekly magazine, brochure, or the like. The sheets book-bound by the saddle stitcher 1107 is exhausted onto a booklet tray 1108.

In addition, a bind function by gluing for bookbinding, a trim function of trimming the end faces opposite to those which are bound after the bind process, and the like may be added, although not shown in FIG. 11.

An inserter 1103 is used to feed a sheet set on a tray 1110 to one of the trays 1101, 1102, and 1108 without going through the printer. In this manner, a sheet set on the inserter 1103 can be inserted between sheets fed into the finisher unit 209. The user sets sheets on the tray 1110 of the inserter 1103 facing up, and a pickup roller 1111 feeds sheets in turn from the uppermost one. Therefore, when a sheet from the inserter 1103 is directly conveyed to the tray 1101 or 1102, it is exhausted facing down. When a sheet is to be fed from the inserter 1103 to the saddle stitcher 1107, it is temporarily fed toward the puncher 1106, and is switched back to adjust the direction of the face.

[Arrangement of Document Server 102]

Figure 12:
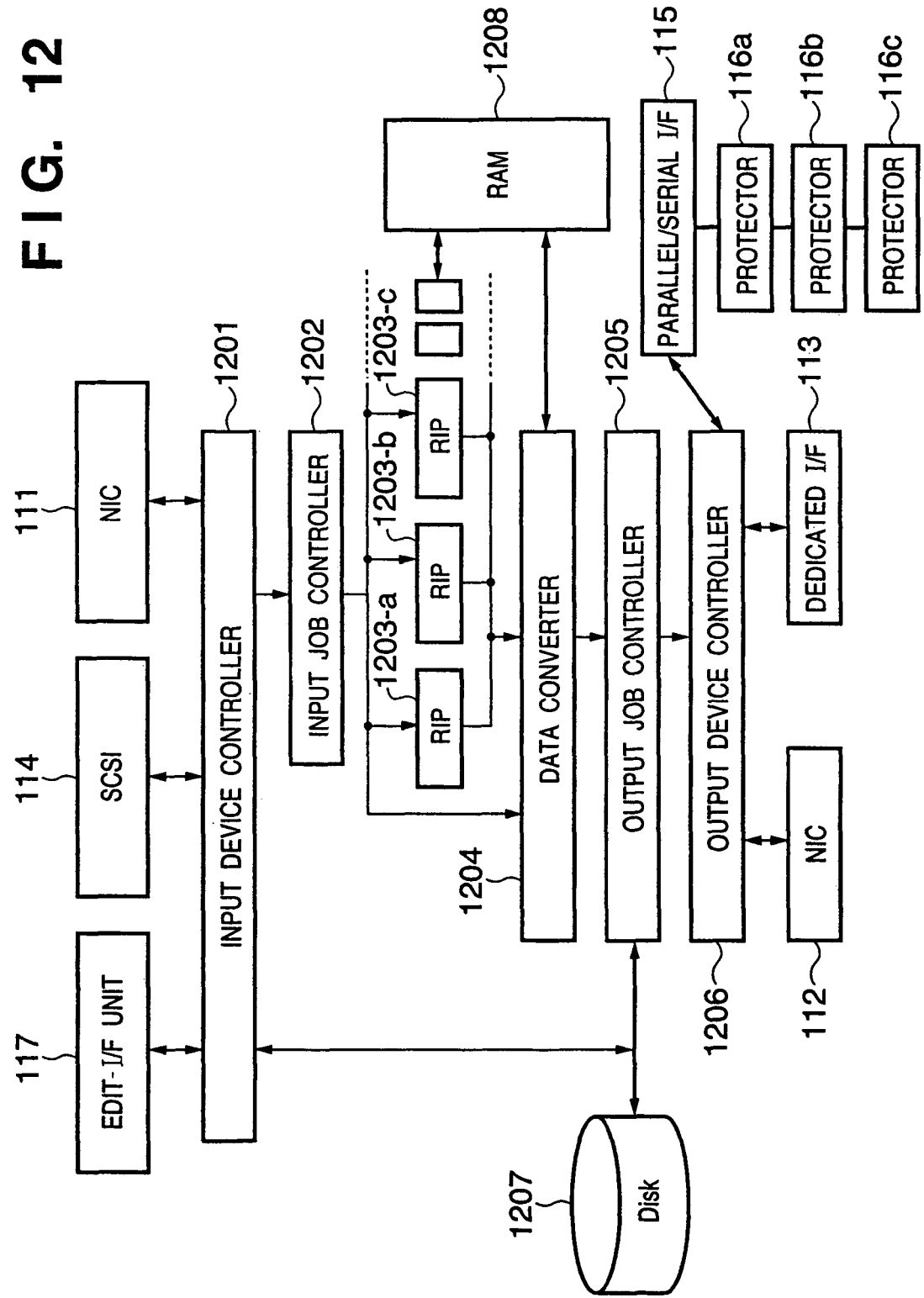
FIG. 12 is a functional block diagram showing the internal processing arrangement of a document server in FIG. 1A.

The arrangement of the document server 102 will be described below using the block diagram of FIG. 12.

A client print job as a processing request input from the NIC 111 or SCSI 114 is fetched into the server by an input device controller 1201, and plays its role together with various client applications in the server. As an input client print job, PDL (Page Description Language) data and JCL (Job Control Language) data are accepted. The input device controller 1201 is compatible to various clients using status information that pertains to the printer and server, and an output of this module serves to couple all building components of appropriate PDL and JCL.

An input job controller 1202 generates a job list to manage a request list of client print jobs, and to access each individual client print job to be provided to the server. Furthermore, this module has three functions, i.e., a job routing function of determining the route of a print job, a job split function of controlling if each job is to be split and undergo RIP, and a job scheduling function of determining the order of print jobs.

One or a plurality of rasterize image processors (RIPs) 1203 (1203-*a*, 1203-*b*, 1203-*c*) are present. The number of RIPs may be increased as needed, and these RIPs will be generally denoted by reference numeral 1203. Each RIP module executes an RIP process of PDL data of various jobs to generate bitmap data with appropriate sizes and resolutions. As for the RIP process, rasterize processes in various formats such as PCL, TIFF, JPEG, PDF, and the like in addition to PostScript (tradename of Adobe Systems Incorporated) can be made.

A data converter 1204 serves to compress bitmap data generated by the RIP and to convert its format, and selects an optimal mage type that matches each individual printer. For example, when a client print job is to be processed for respective pages, a PDF (Portable Document Format) header is appended to bitmap data obtained by rasterizing TIFF or JPEG data by the RIP module to edit these data as PDF data. In this way, print data generated by converting a client print job as a processing request into a format suitable for a print apparatus which is used to output the job or by splitting such job will be referred to as a print job hereinafter.

An output job controller 1205 takes page images of a print job, and manages how to process these images based on command configurations. The page images are printed by a printer or are saved in a hard disk 1207. Whether or not a print job after the print process is left in the hard disk 1207 is selectable, and if the print job is saved, it can be called again. Furthermore, this module manages interactions between the hard disk 1207 and a RAM 1208.

An output device controller 1206 controls a device used to output a job or devices to be clustered (by connecting a plurality of devices to execute print process at the same time), and sends such control information to the interface card 112 or 113 of each selected device. Also, this module serves to monitor the states of the MFPs 104 and 105 and to inform the document server 102 of device status.

[Page Description Language (PDL)]

PDL data used in this embodiment will be described below. Descriptions of PDL represented by the PostScript (tradename of Adobe Systems Incorporated) language are categorized into the following three elements:

(a) image description by character codes;
(b) image description by graphic codes; and
(c) image description by raster image data.

That is, PDL is a language that describes an image which is formed by a combination of the above elements, and data described in this language is called PDL data.

Figures 13A, 13B:
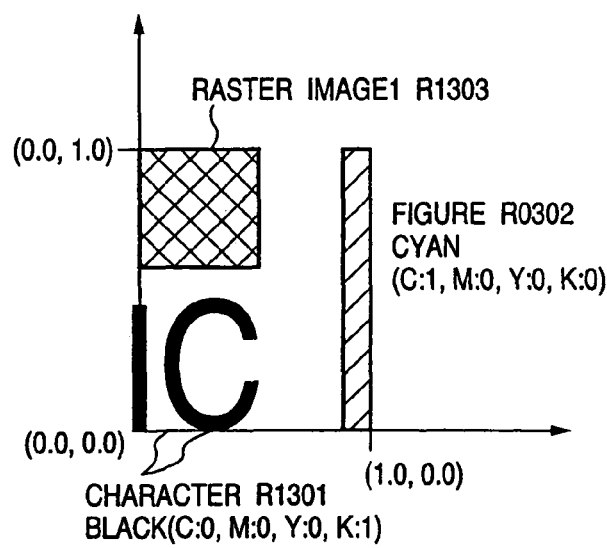
FIG. 13A shows a description example of PDL data.
FIG. 13B shows a rendering example of the PDL data in FIG. 13A.

FIG. 13A shows an example of PDL data, and FIG. 13B shows an image rendered according to the PDL data shown in FIG. 13A. Three lines L1311 to L1313 in FIG. 13A are descriptions corresponding to character R1301 in FIG. 13B, two lines L1321 and L1322 in FIG. 13A are descriptions corresponding to figure R1302 in FIG. 13B, and lines L1331 to L1332 (middle lines are omitted) in FIG. 13A are descriptions corresponding to raster image image1 in FIG. 13B.

The descriptions of character information R1301 will be explained below. In L1311, a character color is designated, and values in parentheses indicate Cyan, Magenta, Yellow, and Black densities in turn within the range from 0.0 to 1.0. In this description, black is designated as a character color. In L1312, a character string "IC" is substituted in variable String1. In L1313, the first and second parameters indicate the x- and y-coordinates of a start coordinate position on a paper sheet where a character string is to be laid out, the third parameter indicates a character size, the fourth parameter indicates the spacing between characters, and the fifth parameter indicates a character string to be laid out. That is, L1313 instructs to lay out a character string "IC" from a coordinate position (0.0, 0.0) with a size=0.3 and a spacing=0.1.

The descriptions of figure R1302 will be described below. In L1321, a line color is designated as in L1311, and Cyan is designated in this case L1322 contains a description that designates to draw a line, the first and second parameters indicate the x- and y-coordinates of a start point coordinate position of a line, and the third and fourth parameters indicate those of an end point coordinate position. The fifth parameter indicates the width of a line.

Furthermore, the descriptions of raster image image1 will be explained below. In L1331, a raster image is substituted in variable image1. In this line, the first parameter indicates the image type and the number of color components of a raster image, the second image indicates the number of bits per color component, and the third and fourth parameters indicate the x- and y-image sizes of the raster image. The fifth and subsequent parameters represent raster image data. The number of raster image data is specified by the product of the number of color components which forms one pixel, and the x- and y-image sizes. In L1331, since a CMYK image is formed by four color components (Cyan, Magenta, Yellow, Black), the number of raster image data is 4×5×5. Also, L1332 designates to lay out image 1 in a 0.5×0.5 size.

The raster image data shown in FIG. 13B is rendered on the RAM 1208 (or Disk 1207) for each of C, M, Y, and K color components in practice. For example, C=0, M=0, Y=0, and K=255 is stored in C, M, Y, and K areas of the RAM 1208 in correspondence with R1301, and C=255, M=0, Y=0, and K=0 are stored in correspondence with R 1302.

In the document server 102, PDL data sent from the client 103 is written in the RAM 1208 (or Disk 1207) as it is or after it is rendered to a raster image, as described above, and is saved as needed. Since the document server 102 itself has the same functions as those of the client, PDL data which is generated by a printer driver in accordance with raster data generated by an application is also written in the RAM 1208, and is saved as needed.

[Network 101]

The network 101 will be described below with reference to FIG. 14. As shown in FIG. 14, as the network 101, networks with the configuration indicated by 101a in FIG. 1 above are connected via routers which interconnect networks to form another network 1406 called a LAN (Local Area Network).

The LAN 1406 may be connected to an internal router 1405 of another LAN 1407 via its internal router 1401 and dedicated line 1408. By interconnecting such networks, a large-scale network including many apparatuses may be formed.

Figure 15:
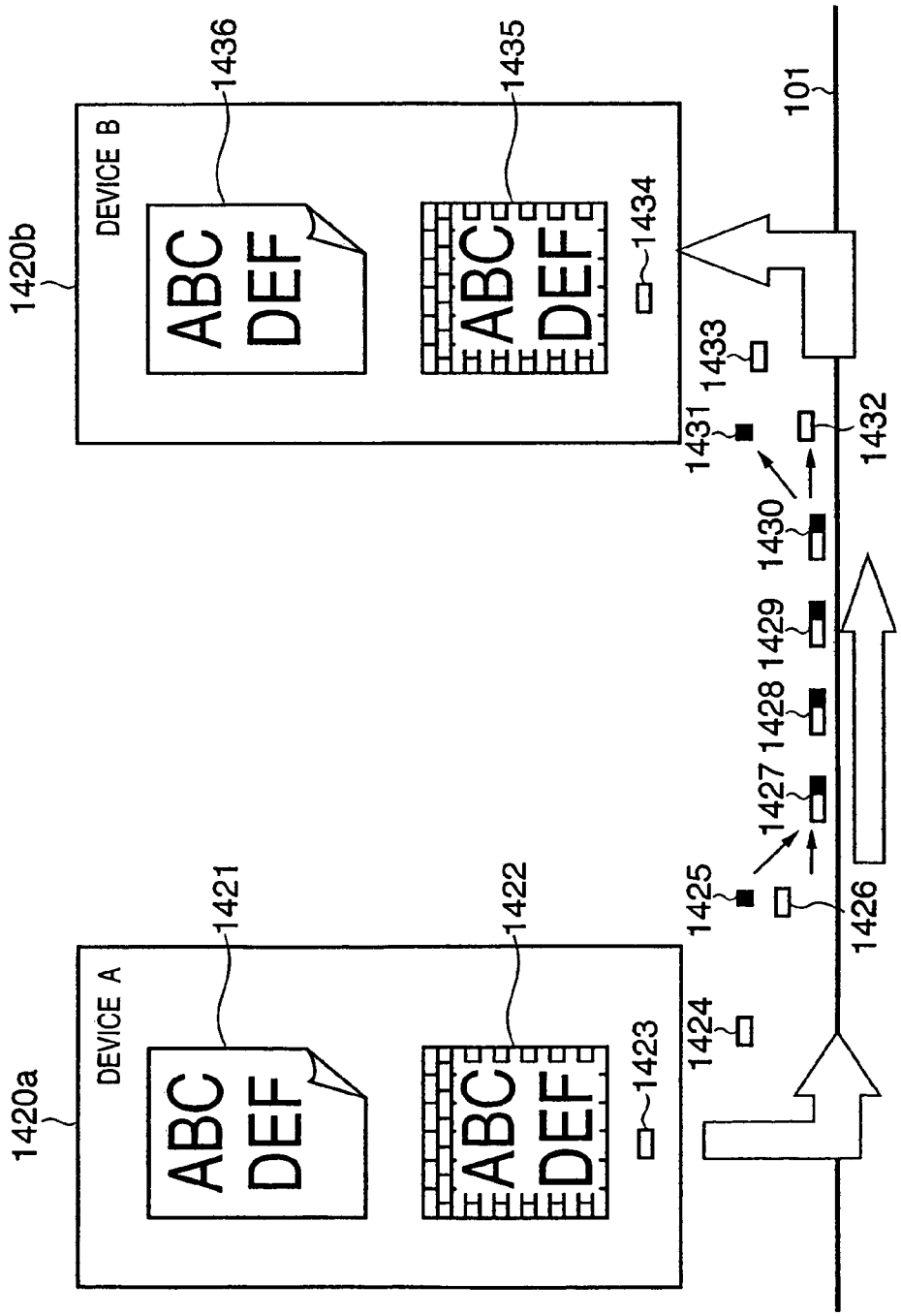
FIG. 15 is a view showing data transfer in the network.

Data to be transmitted through the network 101 will be explained below with reference to FIG. 15. When data 1421 in source device A (1420a) is to be transferred to destination device B (1420b) via the network 101, the data 1421 is segmented like an image 1422 independently of its data type (image data, PDL data, program). A destination address called a header 1425 (IP address in case of TCP/IP protocol) is appended to each of segmented data 1423, 1424, 1426, and the like to form a packet 1427, which is sent in turn on the network 101. When the address of device B matches a header 1431 of a packet 1430, data 1432 is depacketized to reconstruct an image as in source device A.

[Scanner Driver]

A scanner driver will be described below with reference to FIG. 16.

Figure 16:
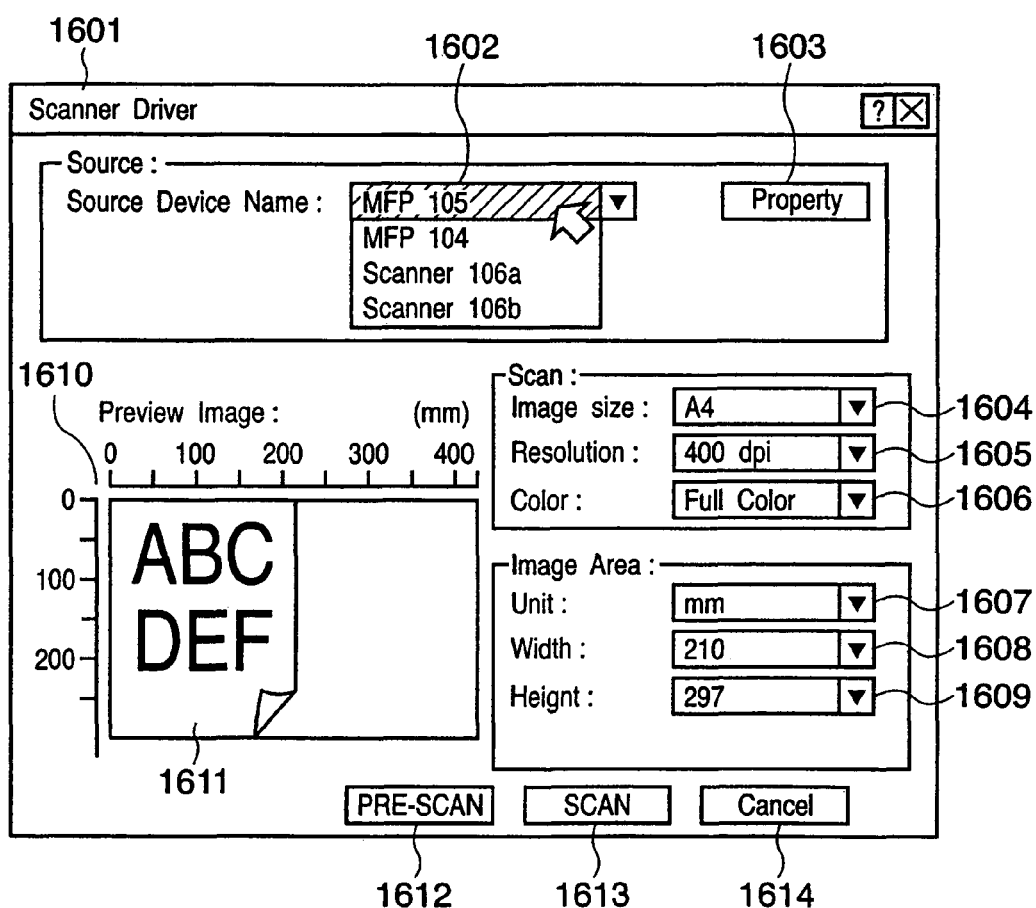
FIG. 16 shows an example of a display window of a scanner driver.

FIG. 16 shows a GUI (Graphical User Interface) which is displayed on a screen of the document server 102 (or client 103) by a scanner driver which is used to instruct a scan operation. The user designates desired configuration parameters using this interface to obtain data of a desired image.

Reference numeral 1601 denotes a window of the scanner driver, which includes a source device select column 1602 used to select a source device as a target. In general, the aforementioned scanner 201 or the like is selected, or an image may be input from the memory 108, a digital camera, or the like. Reference numeral 1603 denotes a button used to configure details of the selected source device. By clicking this button, another window pops up to allow the user to input configuration information unique to that device and to select an image processing mode (e.g., text mode/photo mode), so that an image can be input in a processing mode suitable for data. Columns 1604, 1605, and 1606 are used to respectively select an image size, resolution, and color mode. Also, columns 1607 to 1609 are used to determine the size of an image area, i.e., to input a unit, width, and height.

After these designations, when the user clicks a pre-scan key 1612, the document server 102 (or client 103) issues a pre-scan instruction to the device selected using the source device select column 1602 to start image input. In this mode, an image is scanned at a resolution coarser than the practical resolution, and the obtained image is displayed on an area 1611 as a preview image. The image is displayed together with a scale 1610 according to the unit 1607 of the image area.

If the user determines that the preview image is OK, he or she clicks a scan key 1613 to issue a scan instruction, and an image is input (scanned) at the set resolution in turn. If the user determines that the preview image is NG, he or she executes pre-scan operation again to confirm an image. If the user cancels the scan process, he or she clicks a cancel key 1614.

[Printer Configuration]

Figure 17:
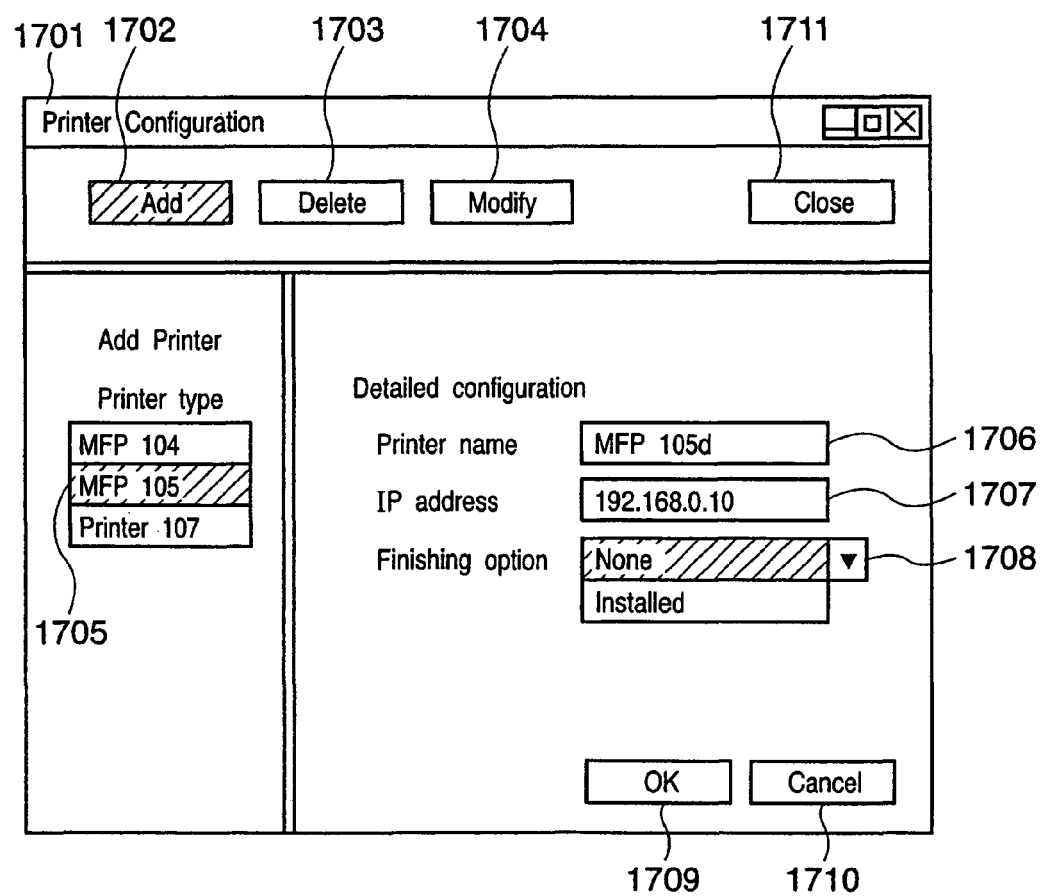
FIG. 17 shows an example of a display window upon printer configuration.

The printer configuration will be explained below using FIG. 17. The printer configuration designates the output destination of a print job or the input source of a scan image in the document server 102 by a GUI displayed on the document server 102 (or client 103).

The GUI will be explained first. Reference numeral 1701 denotes a printer configuration window, on which the user selects one of "add" 1702, "delete" 1703, and "modify" 1704 of a printer first. When the user has selected "add" 1702, he or she selects a printer type 1705, and then configures detailed information according to the selected printer type. When the user has selected the MFP 105 connected to the network, he or she configures a printer name 1706, IP address 1707, and installed state 1708 of a finishing option, and then clicks an OK button 1709 to additionally register that printer. When the user wants to cancel registration, he or she clicks a cancel button 1710 or a window close button 1711 in place of the OK button 1709, thus canceling registration. The same process is done when the user has selected "delete" 1703 or "modify" 1704.

[Cluster Configuration]

Figure 18:
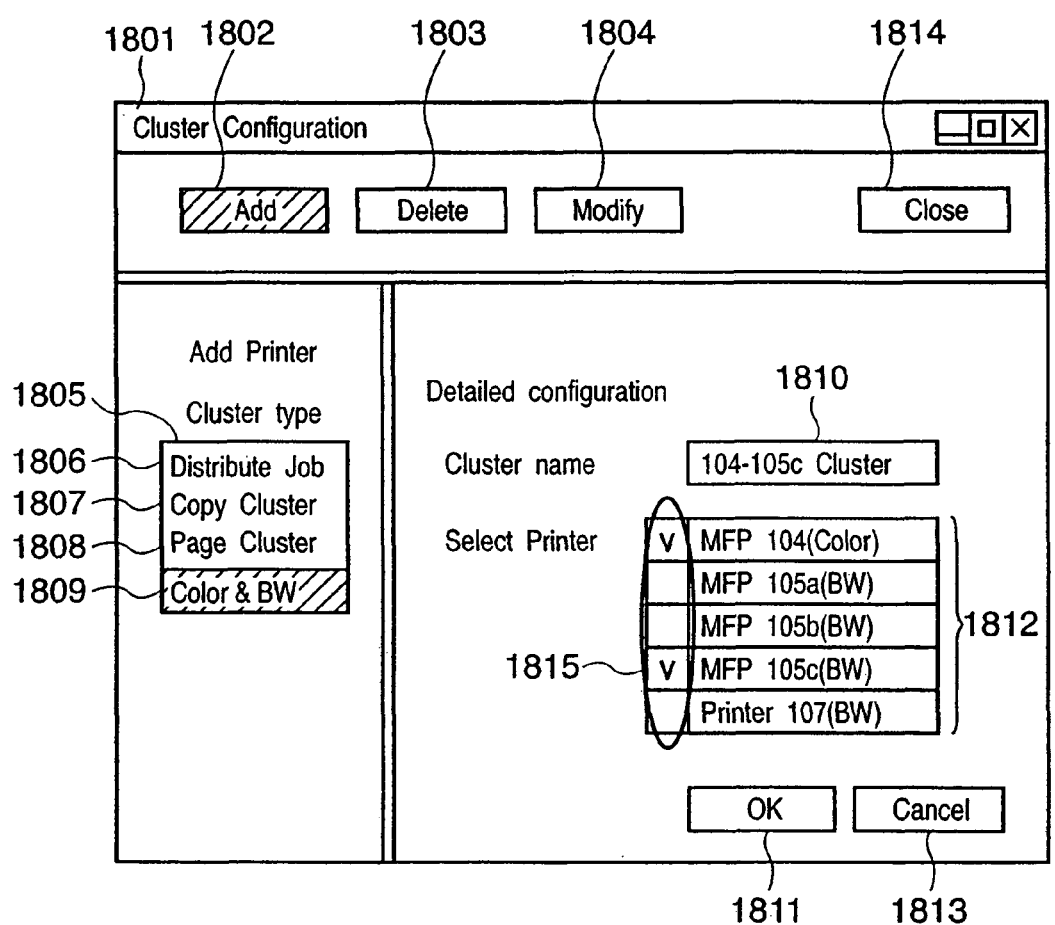
FIG. 18 shows an example of a display window upon cluster configuration.

The cluster configuration will be explained below using FIG. 18. The cluster configuration configures printers as the output destinations of clustering (for connecting a plurality of printers and executing a print process at the same time). The configuration is done using a GUI displayed on the document server 102 (or client 103).

Reference numeral 1801 denotes a cluster configuration window, on which the user selects one of "add" 1802, "delete" 1803, and "modify" 1804 of a cluster first. When the user has selected "add" 1802, he or she then selects a cluster (job split method) type 1805. On this window, as the split methods, "distribute job" 1806, "copy cluster" 1807, "page cluster" 1808, and "color & BW" 1809 are prepared. After the cluster type is selected, the user inputs a cluster name 1810. Also, a list 1812 of printers which have been registered on the printer configuration window and can be registered as output destinations of clustering is displayed, and the user checks check boxes 1815 of printers to be registered as output destinations of clustering. When the user clicks an OK button 1811, the selected printers are registered. When the user wants to cancel registration, he or she clicks a cancel button 1813 or window close button 1814 in place of the OK button, thus canceling registration. The same process is done when the user has selected "delete" 1803 or "modify" 1804.

[Printer Driver]

Figure 19:
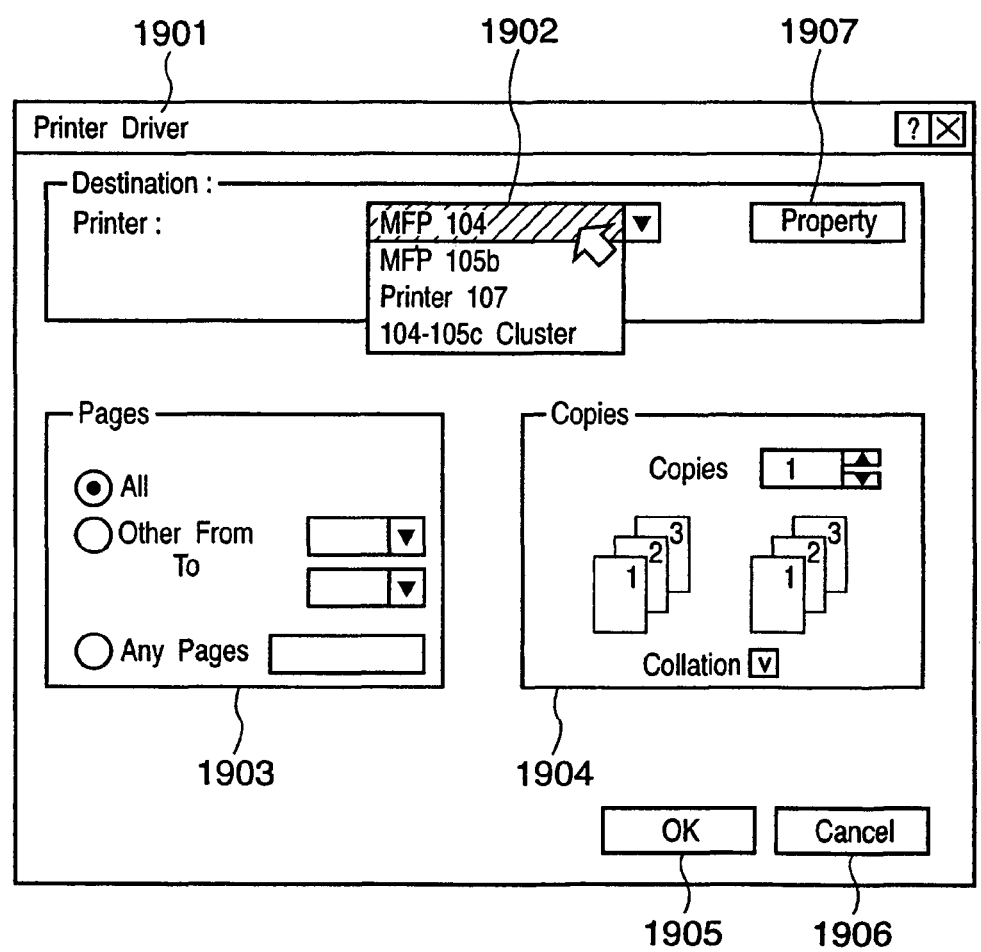
FIG. 19 shows an example of a display window of a printer driver.

A process for sending image data from the document server 102 (or client 103) to a printer via a printer driver will be explained below using FIG. 19. The printer driver can send an image of user's choice to a destination such as a printer or the like in accordance with user's instructions input on a GUT, which is used to instruct print operations.

Reference numeral 1901 denotes a window called a print dialog of the printer driver, which includes as one of configuration items, a destination select column 1902 used to select a destination as a target. In general, the aforementioned MFP 104 or 105, the printer 107, or a logical printer registered in the cluster configuration (in this embodiment, since the MFPs 104 and 105c are configured in the cluster configuration, "104-105c Cluster" is displayed as a logical printer) is selected as the destination. Reference numeral 1903 denotes a page configuration column used to select output pages from a job, i.e., to determine pages to be output of images created by application software, which runs on the document server 102 (or client 103). Reference numeral 1904 denotes a copy number configuration column used to designate the number of copies; and 1907, a property key used to configure details associated with the destination device selected at the destination select column 1902. When the user clicks this key, device unique information which includes the number of sheet feed trays, types of finishing processes, image processing methods, and the like unique to the device is loaded, and configuration items unique to that device are displayed on another window. The device unique information and display of configuration items will be described in detail later. The user can input desired configurations on a detail configuration window by clicking the property key. In this fashion, the user can attain more flexible color reproduction and sharpness adjustment by changing parameters of a special image process, e.g., those of the gamma conversion unit 702 or spatial filter 703 in the printer IP unit 207.

After desired configurations are done, the user clicks an OK button 1905 to start a print job generation process. The user can cancel a print process by canceling a cancel button 1906. In the print job generation process, as the printer driver of the present invention can configure a cluster logical printer, a print job to be generated includes print configurations for a plurality of printers. That is, the printer driver of the present invention generates a print job which has a plurality of sets of print configurations as properties.

[Job Submitter]

Figure 20:
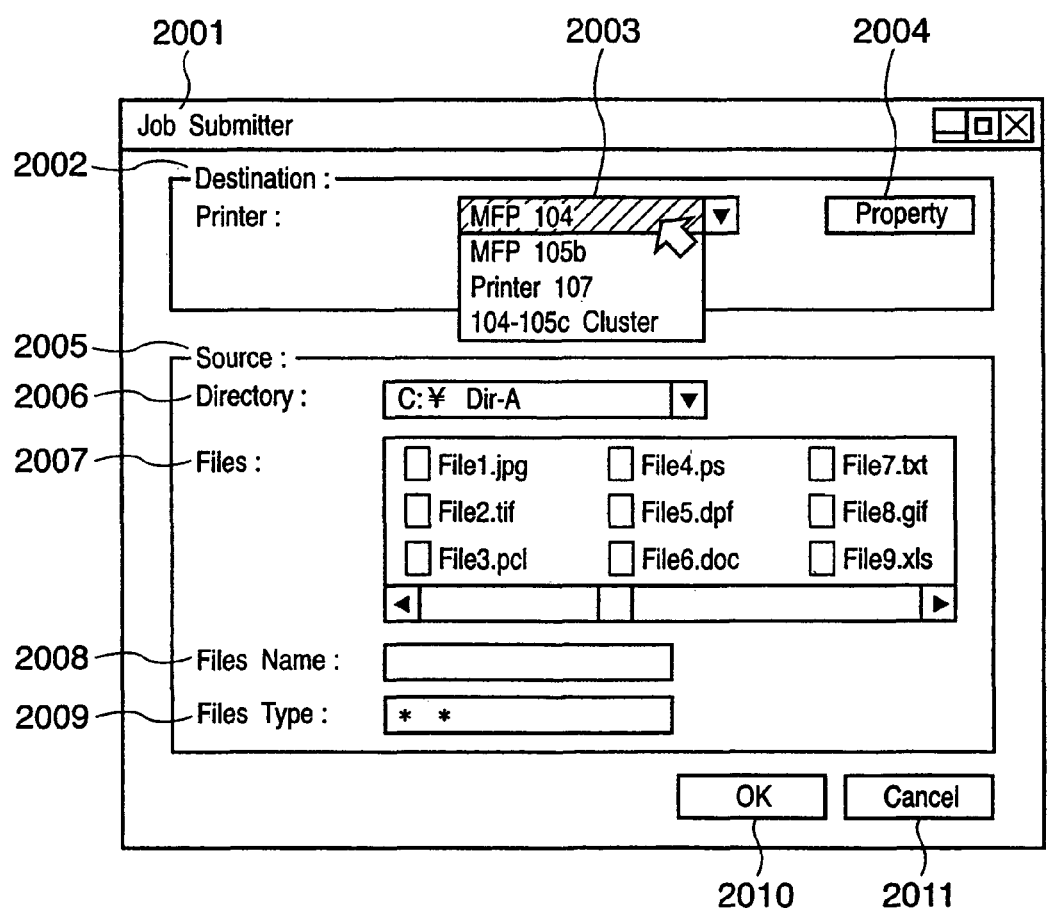
FIG. 20 shows an example of a display window of a job submitter.

A job submitter will be described below using FIG. 20. The method of using the job submitter when viewed from the user side is the same as that of the printer driver mentioned above. The job submitter is a tool for simultaneously sending files on the client 103 to the document server 102. That is, the printer driver launches data by an application on the client 103, converts it into a format such as PS (or PCL) or the like, and sends the converted data to the document server 102, while the sub submitter directly sends data of various formats to the document server 102.

A GUI 2001 of the job submitter includes, as one of configuration items, a destination select column 2002 used to select a destination as a target. The destination is normally selected from the aforementioned MFP 104 or 105, printer 107, and cluster logical printer registered in the cluster configuration. Reference numeral 2005 denotes a page configuration column used to select output pages from a job, and arbitrary files in the document server 102 (or client 103) can be selected and sent to the document server 102. Furthermore, a property key 2004 is prepared to configure details. When the user clicks this key, a job ticket menu on the next page appears. After desired configurations are done, the user clicks an OK button 2010 to send a job to the document server 102. The user can cancel the job by clicking a cancel button 2011.

[Job Ticket]

A job ticket will be explained below using FIG. 21. When the user has clicked the property key (1907 or 2004) on the GUI of the printer driver (FIG. 19) or job submitter (FIG. 20), a job ticket configuration GUI 2101 appears, as shown in FIG. 21.

The job ticket allows the user to configure functions unique to a device such as the MFP 104 or 105, printer 107, or cluster logical printer created in the cluster configuration, and displays individual configuration items 2102 based on device unique information as in the property of the printer driver in accordance with the destination 1902 or 2002 as a target. In this case, the user can select arbitrary configuration items 2103.

After desired configurations are done, when the user clicks an OK button 2104, the printer driver or job submitter window is displayed again. The user can cancel configurations by clicking a cancel button 2105.

Figure 21:
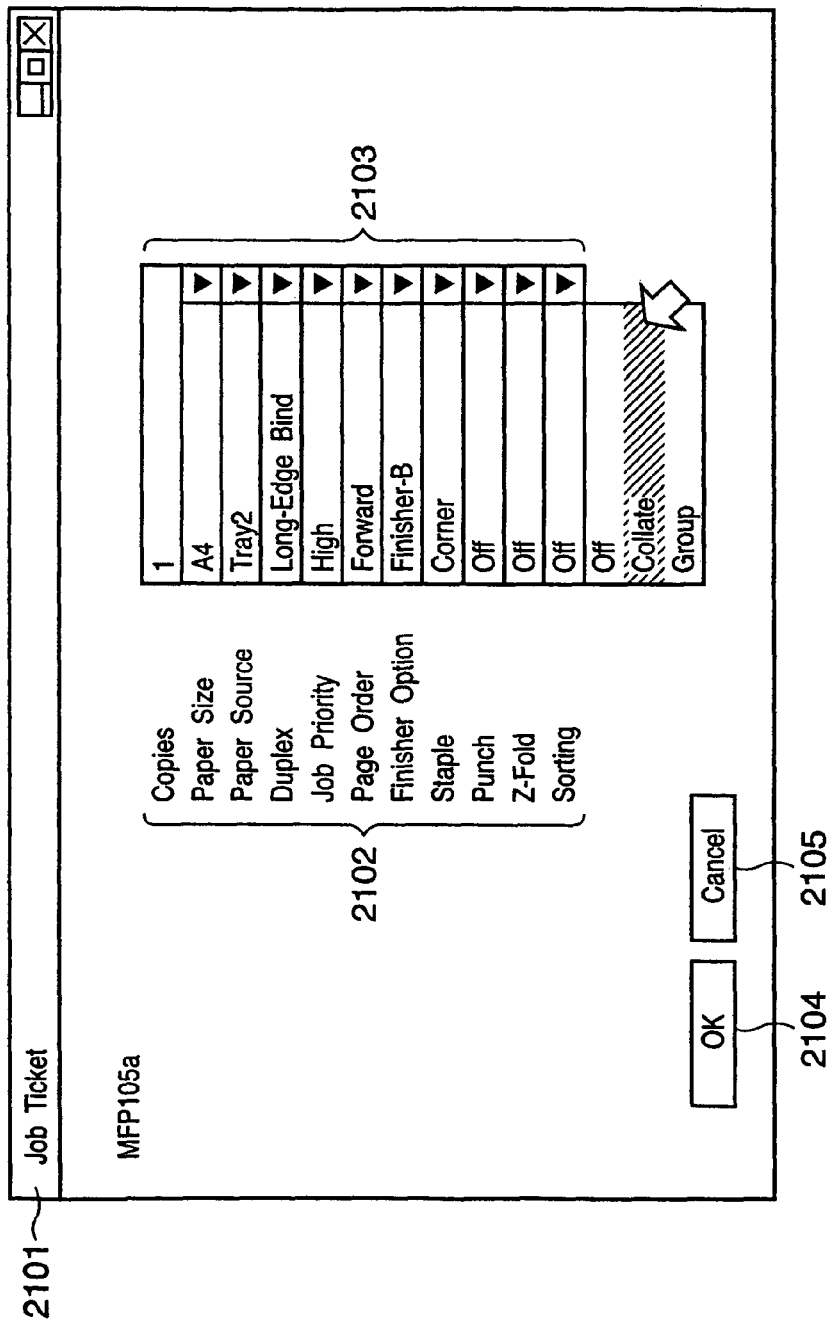
FIG. 21 shows an example of a display window of a job ticket.

When the cluster logical printer created in the cluster configuration is selected as an output device, the job ticket has a plurality of sets 2103 of information shown in FIG. 21.

[Device Status]

A standardized database called an MIB (Management Information Base) is formed in a network interface in the MFP 104 or 105 or the printer 107, and communicates with computers on the network via a network management protocol named SNMP (Simple Network Management Protocol) to exchange status information of devices such as the MFPs 104 and 105, and the like connected to the network with the document server 102 (or client 103).

For example, functions of the finisher 210 connected can be detected as equipment information of the MFP 104 or 105, and errors, paper jam, or print busy or idle status can be detected as status information. That is, every kinds of static information and dynamic information such as equipment information of the MFPs 104 and 105, device status, network configurations, job status, management and control of use conditions, and the like can be acquired.

Figure 22:
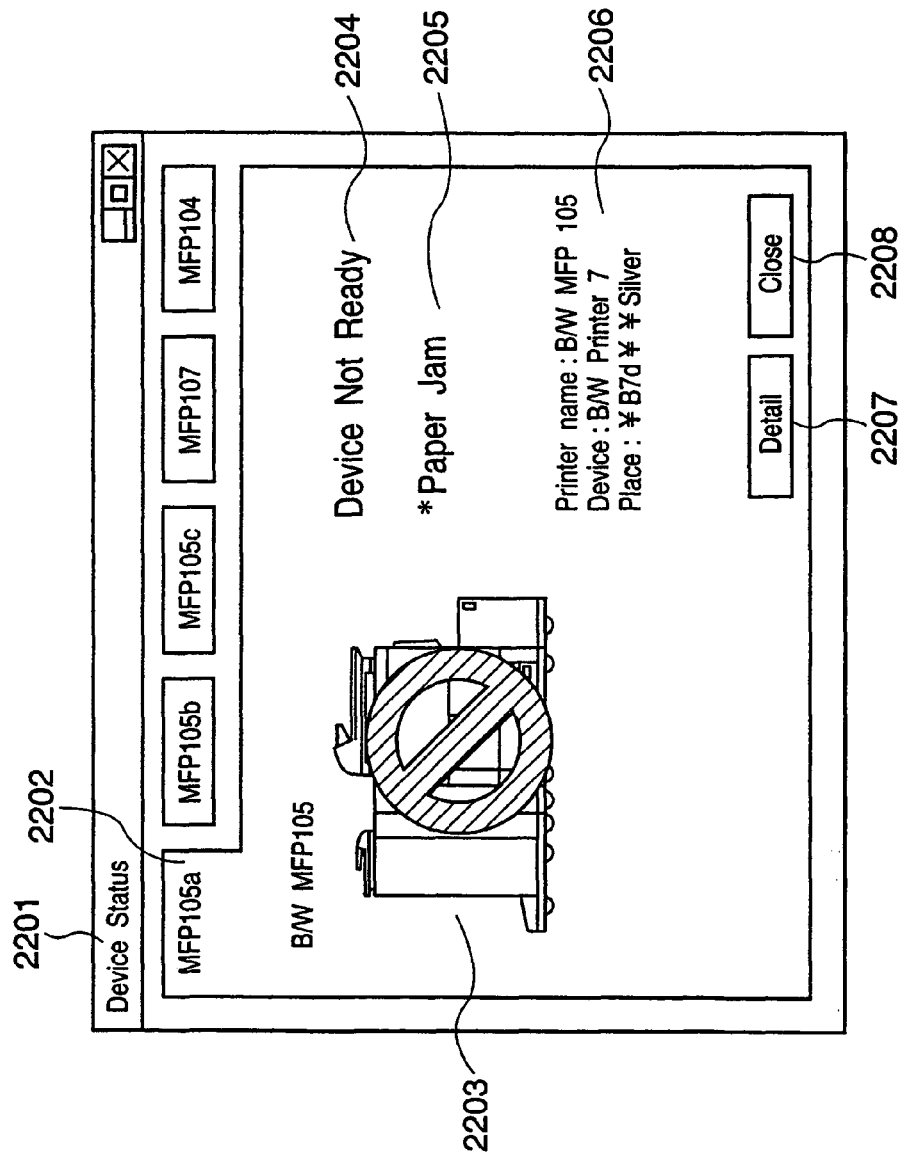
FIG. 22 shows an example of a display window of device status.

FIG. 22 shows a GUI of a utility indicating device status. For example, when a tub 2202 indicating the MFP 105a is selected, device equipment information of the MFP 105a is graphically displayed (2203), and the device condition can be checked based on information 2204 and information 2205. By clicking a detail display key 2207, details of the equipment information or the like can be displayed. By clicking a close key 2208, the device status window is closed.

[Job Status]

Job status will be explained below using FIG. 23. A job status window 2301 displays three kinds of status; i.e., job status 2302 indicating the status of each of print jobs in the document server 102, printing status 2303 indicating the status of each of print jobs that have been passed to the printers, and history of finished job 2304 indicating the history of finished print jobs.

On job status 2302, the status of each print job is expressed by "Waiting" (before RIP) or "Ripping" (during RIP), and a print job that has undergone the RIP process is passed to next print status.

On printing status 2303, each print job is expressed by "Waiting" (ready to print) or "Printing" (during printing) if it is normal, and if any error or jam has occurred, a message indicating this is displayed. After the print process, each job is passed to the next finished job.

On the history of finished job 2304, the history of each print job can be browsed, a normally finished print job is expressed by "Printed", and a canceled print job is expressed by "Canceled".

[Distribute Job]

A case will be explained using the flow chart in FIG. 24 wherein a single job includes both color and monochrome images. FIG. 24 shows a process executed when a color & monochrome cluster printer is selected as a destination of the printer driver or job submitter in the document server 102 or client 103, and a client print job (having a job ticket with a plurality of sets of print configurations; to be referred to as a cluster print job hereinafter) is sent from the client 103 to the document server 102, or when a cluster print job generated by the printer driver of the document server 102 is received.

The document server 102 temporarily spools the received cluster print job in step S2401, and determines the processing order in consideration of priority and the like of the cluster print job in step S2402. The received cluster print job is converted into a format managed for respective pages to allow RIP for respective pages in step S2403. In this case, the cluster print job is converted into the PDF (Portable Data Format) format, and it is then determined in step S2404 by checking the print configurations (contained in the job ticket) of the cluster print job if it is designated by "Manual" whether the entire cluster print job is a color or monochrome job.

If "Manual" is designated, the flow advances to step S2414 to check if the cluster print job is a color job. If NO in step S2414, monochrome RIP is executed for all pages (step S2415); otherwise, color RIP is executed for all pages (step S2416).

On the other hand, if it is determined in step S2404 that "Auto" is designated, it is checked in step S2405 if page designation is made in advance by "Manual". If YES in step S2405, the flow advances to step S2409. It is checked in step S2409 if a page of interest is designated as a color page, so as to execute RIP processes designated for respective pages. If the page of interest is designated as a monochrome page, monochrome RIP is executed (step S2410); if the page of interest is designated as a color page, color RIP is executed (step S2411). Every time the RIP of each page is complete, it is checked if a page end is detected (step S2412). If NO in step S2412, the next page is selected (step S2413) to repeat processes in step S2409 and the subsequent steps.

Upon completion of the RIP processes for all pages, the flow advances to job output control step 52407 to send monochrome pages to the monochrome MFP 105 and color pages to the color MFP 104 and to control the corresponding MFPs (step S2408), thus printing out pages. Prior to this sending process, print data that has undergone the RIP processes for respective pages is divided into color and monochrome pages, and those pages are bounded by a header that controls job start and a footer that controls job end, this re-generating a plurality of print jobs.

[Clustering Print]

Clustering print is a method of simultaneously executing print processes using a plurality of printers to which a single controller is connected, and means, e.g., an operation in which the document server 102 in FIG. 1A simultaneously executes print processes using the four monochrome MFPs (105a to 105d) or the color MFP 104 and monochrome MFP 105.

The aforementioned job which includes both color and monochrome images is split into a plurality of jobs, the destinations (color MFP 104 and monochrome MFP 105) of the jobs that have undergone color and monochrome RIP processes are determined by the output device controller (1206 in FIG. 12), and the jobs are sent to the respective printers, thus outputting images.

As a combination of printers in clustering print, monochrome printers alone, color printers alone, or each one or plurality of color and monochrome printers may be combined. Such combination can be freely configured by the user in the cluster configuration.

[Job Split]

Upon executing clustering print, the following three data split transfer methods are available.

(a) Distribute job: This method is a so-called load balancing method. That is, jobs are transferred to ready printers so that jobs are evenly distributed to respective printers and the number of Waiting jobs becomes relatively small (e.g., job 1 is transferred to the MFP 105a and job 2 is transferred to the MFP 105b)

(b) Copy split: This method evenly splits the number of copies of one job by the number of clustered printers. If an odd copy is generated, that copy is assigned to one of the printers.

(c) Page split: This method evenly splits the number of pages of one job by the number of clustered printers. If an odd page is generated, that page is assigned to one of the printers. Note that color & BW split 1809 corresponds to one process of this page split method.

[Display of Job Ticket]

A method of displaying the job ticket as a configuration window upon clustering for outputting using a plurality of image forming apparatuses in this embodiment will be explained below.

The job ticket is displayed from the printer driver or job submitter, as described above, and is launched on the document server 102 or client 103 together with the printer driver or job submitter.

The printer driver converts a document image to be processed on a computer into PDL data that can undergo an RIP process in the document server, and has a conversion program into PDL data and unique information of image forming apparatuses serving as output destinations.

On the other hand, the job submitter has a submit program for directly submitting a document image file to the document server 102, and unique information of image forming apparatuses serving as output destinations.

The unique information of image forming apparatuses serving as output destinations (to be referred to as device unique information hereinafter) includes data which indicate attributes such as the number of sheet feed trays, paper sizes that can be set in the sheet feed trays, the types of finishing options, the types of finishing such as staple, punch, and the like if finishing options are available, and the like. The device unique information includes attribute information 2501 and values 2502 that each attribute information 2501 can assume.

By reflecting such device unique information on the window of a computer terminal, a print configuration window (also called a job ticket window in this embodiment) used to designate various processing methods of finishing and the like, which are processed by each image forming apparatus in a print process, is displayed. When a print instruction is issued from the printer driver, information of the print processing methods designated by the user is output in the form of PDL data which contains the job ticket as the print configuration, or when a document image file is submitted by the job submitter, job ticket information is output together with the document image file.

[Generation of Job Ticket]

Figure 26:
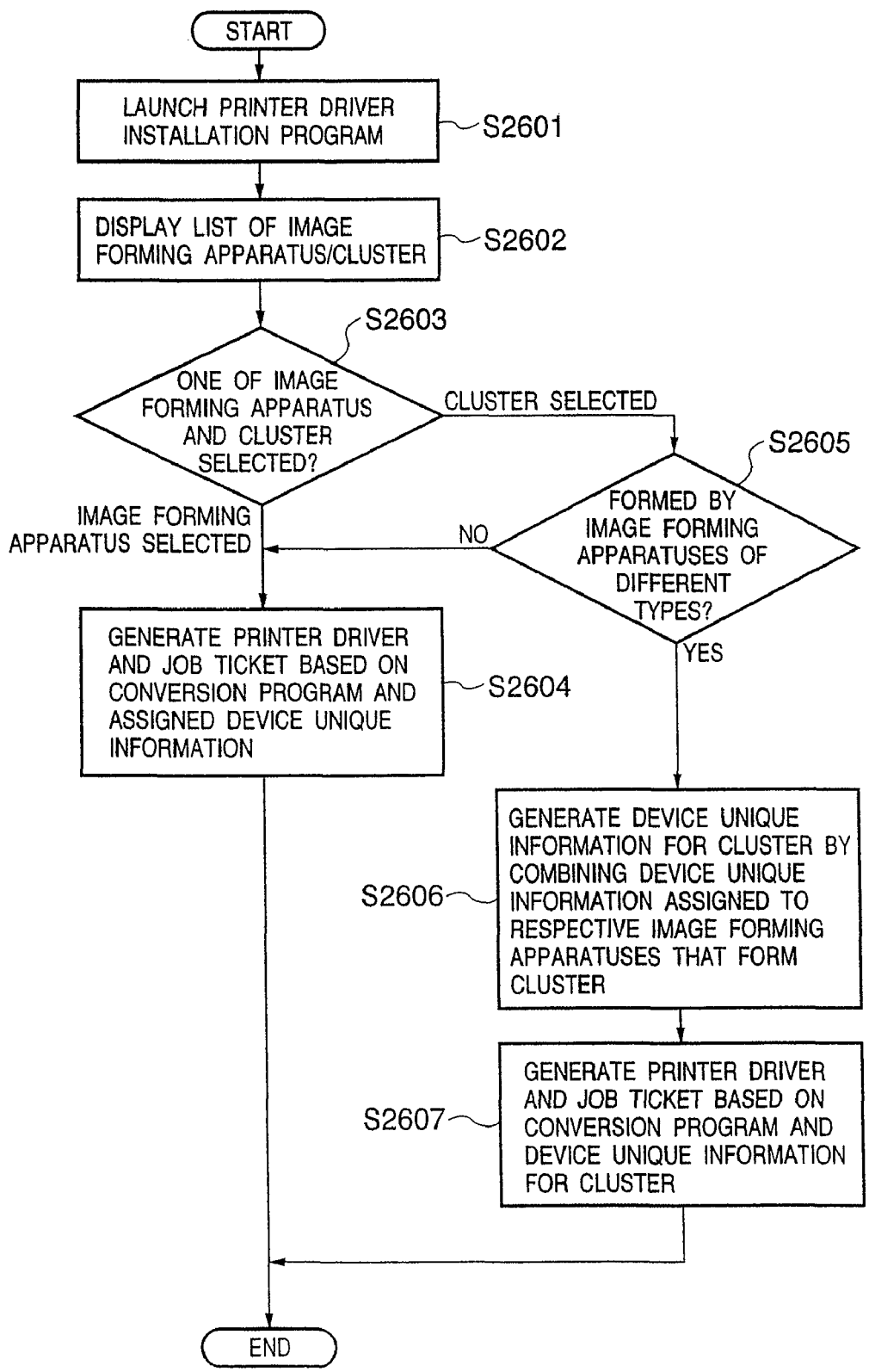
FIG. 26 is a flow chart showing the operation upon installing a printer driver.

Generation of a print configuration window of a cluster logical printer and display of the window on a screen upon installing the printer driver will be explained below using the flow chart of FIG. 26.

Upon installing the printer driver, the user runs a printer driver installation program on a desired computer terminal (document server 102 or client 103) The printer driver installation program generates a printer driver and a print configuration window (job ticket window) on the basis of a conversion program to PDL data and image information apparatus unique information stored in the document server 102 or client 103.

Figure 27:
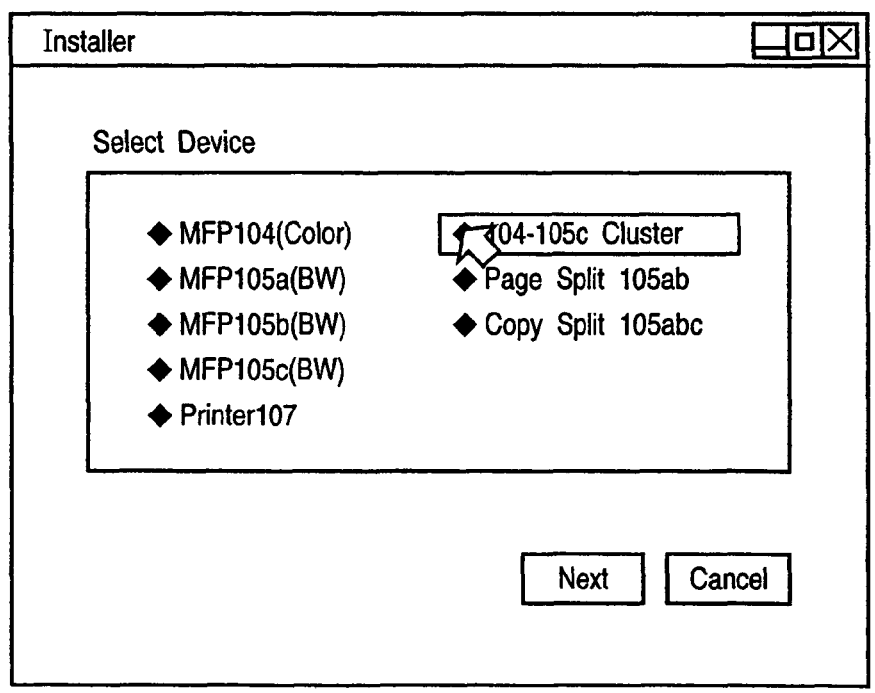
FIG. 27 shows an example of a display window of a printer driver installer.

If the printer driver installation program is launched in step S2601, image forming apparatuses connected to the document server 102 and configured cluster logical printers are displayed on the screen of the computer terminal in step S2602, as shown in FIG. 27. In step S2603, the user selects a desired one of image forming apparatuses or clusters.

If the user has selected an image forming apparatus in step S2603, the printer driver installation program generates a printer driver and job ticket on the basis of the conversion program and device unique information assigned to the selected image forming apparatus, which are stored in the disk 1207 or RAM 1208 of the document server 102 in step S2604. When a printer driver and job ticket are to be generated on the client 103, the conversion program and device unique information, which are stored in the document server 102, are output to the client 103 via the network 101, and the printer driver and job ticket are generated on the client 103 based on them.

On the other hand, if the user has selected a cluster logical printer in step S2603, it is checked in step s2605 if the selected cluster logical printer is formed by image forming apparatuses of an identical type (e.g., a cluster "Page Split 105*ab*", that distributes respective pages to the MFPs 105*a* and 105*b*) or by those of different types (e.g., the MFP 104 (color) and MFP 105*c* (B/W: black & white)).

If it is determined in step S2605 that the selected cluster logical printer is formed by image forming apparatuses of an identical type, the flow advances to step S2604 to generate a printer driver on the basis of the conversion program and device unique information associated to the image forming apparatuses in the same manner as in the case of the image forming apparatus. As will be described later, since a job ticket window of the generated printer driver changes in correspondence with the number of print configurations that can be configured, a user interface dynamically changes in accordance with the acquired device unique information. For example, a job ticket window of a printer driver for a single device is displayed, as shown in FIG. 21, and that of a printer driver for a cluster logical printer (especially, printers with different attributes) is displayed, as shown in FIG. 29.

On the other hand, if it is determined in step S2605 that the selected cluster logical printer is formed by image forming apparatuses of different types, the document server 102 combines (nixes) device unique information of respective image forming apparatuses, which form the cluster logical printer in step S2606, and generates device unique information for the selected cluster in step S2603.

When the device unique information for the selected cluster is generated by combining a plurality of pieces of information, the document server 102 appends type information of each image forming apparatus to attribute information 2401 of each device unique information. For example, if the cluster logical printer is formed by the image forming apparatuses 104 and 105*c*, device unique information, which is appended with type information of image forming apparatuses, as shown in FIG. 28C, for a cluster which is formed by the image forming apparatuses 104 and 105*c* is generated on the basis of the device unique information of the MFP 104 shown in FIG. 28A, and that of the MFP 105 shown in FIG. 28B.

In step S2607, a printer driver for the cluster is generated on the basis of the device unique information for the cluster logical printer generated in step S2606, and the conversion program.

FIG. 29 shows a job ticket window used to configure details of print processing methods for a cluster logical printer, which is formed by image forming apparatuses of different types, using the printer driver generated in this way. As shown in FIG. 29, correspondence between the configurations and image forming apparatuses can be easily determined from this window. If device unique information of this embodiment is implemented by a PPD (PostScript Printer Description) file, a PostScript printer driver can change the UI of a printer driver used to make a print configuration with reference to this PPD file, and a user interface used to make print configurations of color and monochrome printers can be provided, as shown in FIG. 29.

Upon installing the job submitter, a job ticket window can be generated in the same manner as in steps S2601 to S2607 using a submit program in place of the conversion program of the printer driver.

Figure 30:
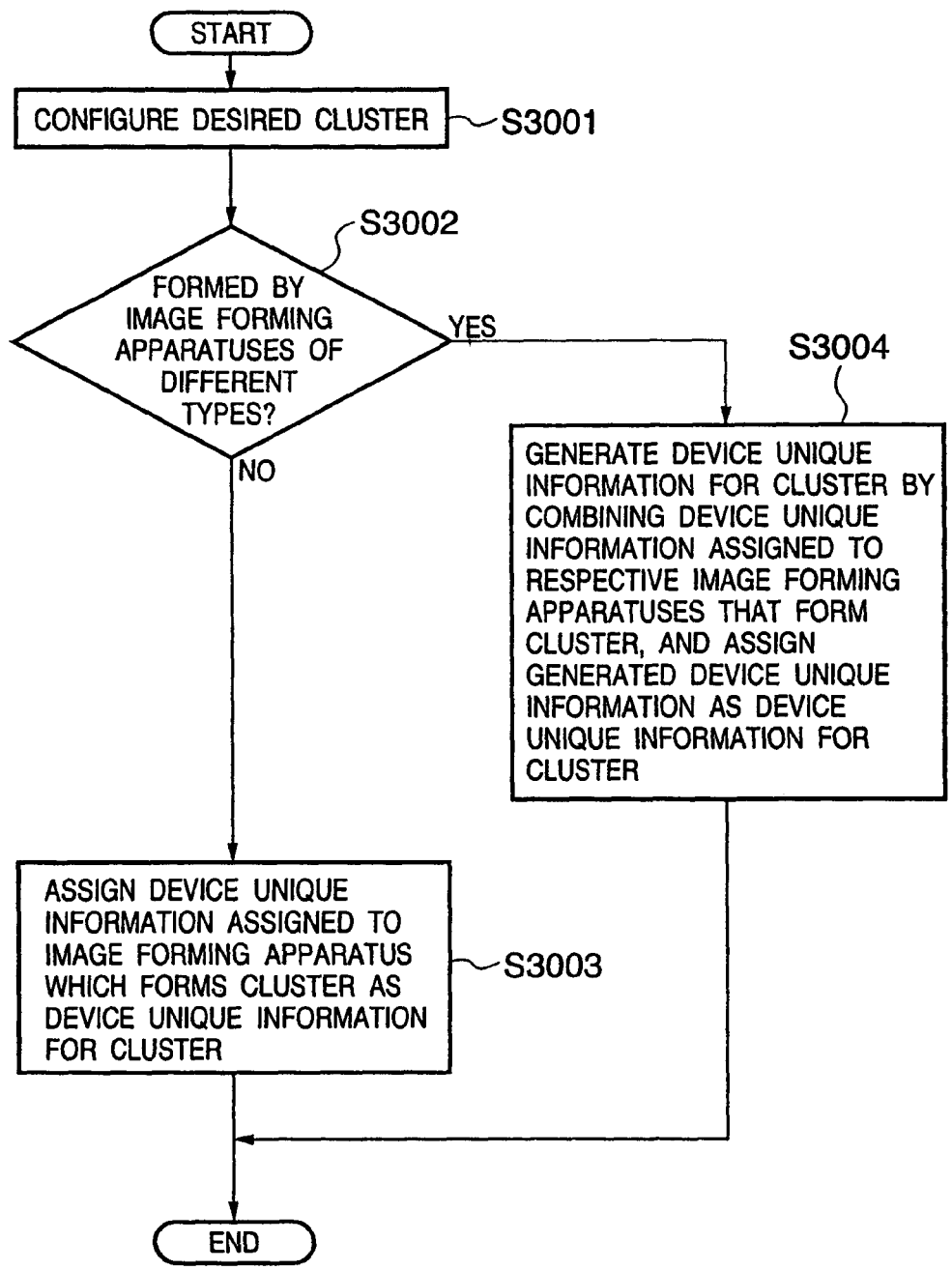
FIG. 30 is a flow chart showing the operation upon cluster configurations.

Device unique information for a cluster may be generated upon cluster configuration. FIG. 30 is a flow chart showing the process when device unique information for a cluster is generated upon cluster configuration.

If the user configures a desired cluster logical printer on the document server 102 or client 103 in step S3001, the document server 102 checks in step S3002 if the configured cluster printer is formed by image forming apparatuses of an identical type (e.g., a cluster formed by the MFPs 105*a* and 105*b*) or by those of different types (e.g., a cluster formed by the MFPs 104 and 105*c*).

If it is determined that the selected cluster logical printer is formed by image forming apparatuses of an identical type, the device unique information of the corresponding image forming apparatus, which is stored in the disk 1207 or ROM 1208 of the document server 102, is assigned as that for the cluster logical printer in step S3003.

On the other hand, if it is determined that the selected cluster logical printer is formed by image forming apparatuses of different types, the document server 102 generates device unique information for the configured cluster by combining those of respective image forming apparatuses, which form the cluster, in step s3004.

When the device unique information for the cluster is generated by combining a plurality of pieces of information, the document server 102 appends type information of each image forming apparatus to attribute information 2401 of each device unique information. For example, if the cluster logical printer is formed by the image forming apparatuses 104 and 105*c*, device unique information, which is appended with type information of image forming apparatuses, as shown in FIG. 28C, for a cluster which is formed by the image forming apparatuses 104 and 105*c* is generated on the basis of the device unique information of the MFP 104 shown in FIG. 28A, and that of the MFP 105 shown in FIG. 28B, and the generated information is assigned as device unique information of the configured cluster logical printer.

In this way, device unique information is generated and assigned upon cluster configuration, and the assigned device unique information is used upon installing the printer driver or job submitter. Hence, on a job ticket window (print configuration window) of a cluster logical printer formed by image forming apparatuses of different types, correspondence between the configurations and image forming apparatuses can be easily determined, as shown in FIG. 29.

As described above, according to this embodiment, when a single print request is executed using a plurality of image forming apparatuses, correspondence between the configurations and image forming apparatuses can be easily determined from the displayed window upon configuring image processes, sheet feed trays, finishing processes, and the like, which are processed by the image forming apparatuses. Hence, the user can easily make configurations without being familiar with the specifications and features of respective image forming apparatuses or the names of respective units and the like.

Unlike in the prior art in which configurations for respective image forming apparatuses are prepared in advance, and those for image forming apparatuses used are selected upon outputting using a plurality of image forming apparatuses, the user can arbitrarily make configurations for respective image forming apparatuses upon outputting using a plurality of image forming apparatuses, thus allowing simple operations without requiring any preparations or configurations.

Second Embodiment

The second embodiment of the present invention will be described below. The second embodiment will also explain an image forming system which is similar to that in the first embodiment, and is designed to allow the user to easily identify items to be commonly configured of those to be configured for respective image forming apparatuses upon executing a single job using a plurality of image forming apparatuses.

Note that the same reference numerals denote the same parts as in the first embodiment, a description thereof will be omitted, and features of the second embodiment will be mainly explained.

Figure 31:
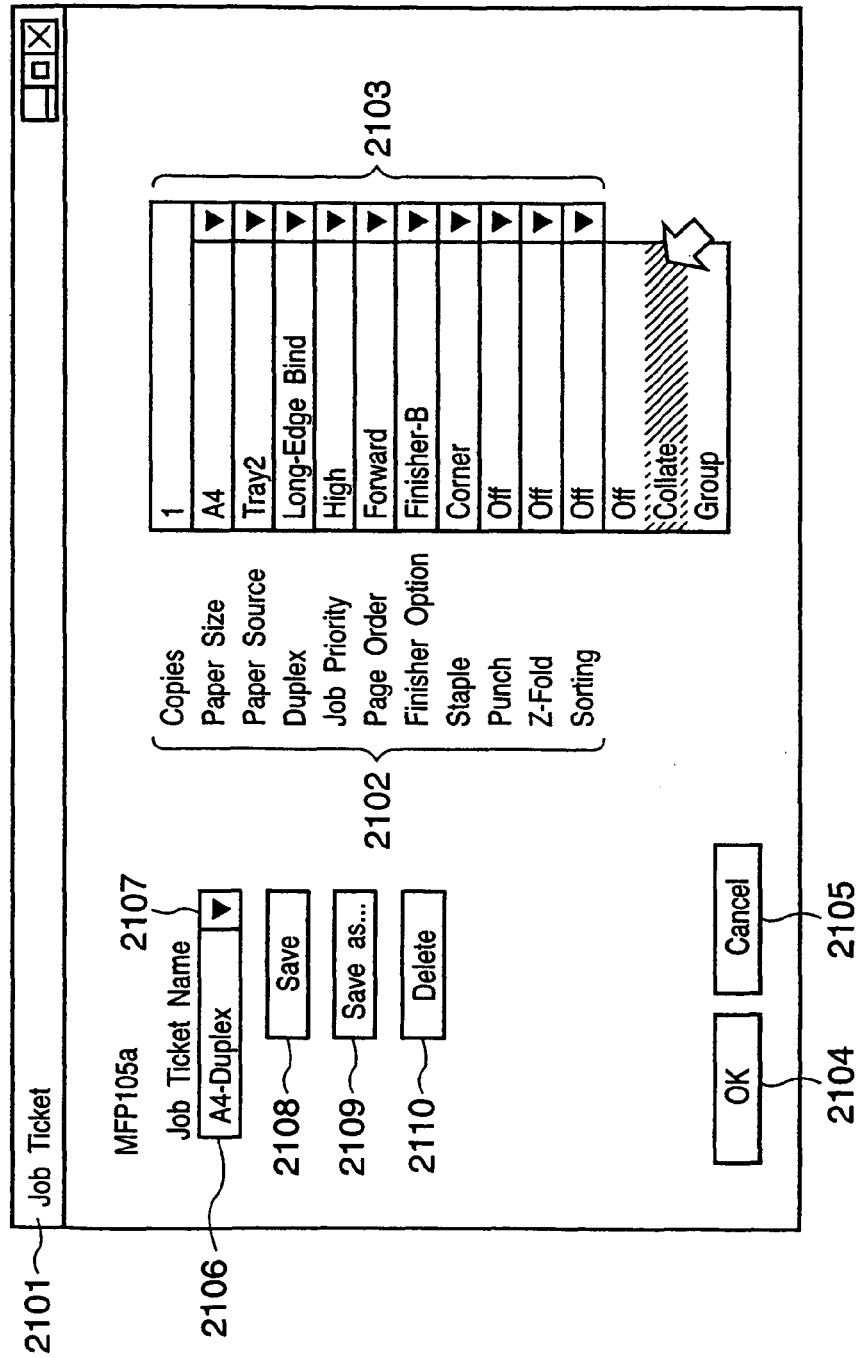
FIG. 31 shows an example of a display window of a job ticket of the second embodiment.

FIG. 31 shows a GUI 2101 used to configure a job ticket in this embodiment. In this embodiment, a configuration that has been made can be saved with a name, in addition functions that can be implemented by the GUI of the first embodiment shown in FIG. 21. The names of saved job tickets are displayed on a field 2106, and one of these tickets can be selected by clicking a key 2107. Furthermore, a modified configuration may be saved by a save key 2108, or may be saved with a new job ticket name by a "save as" key 2109. The ticket can be deleted by clicking a delete key 2110.

[Configure Job Ticket]

Figure 32:
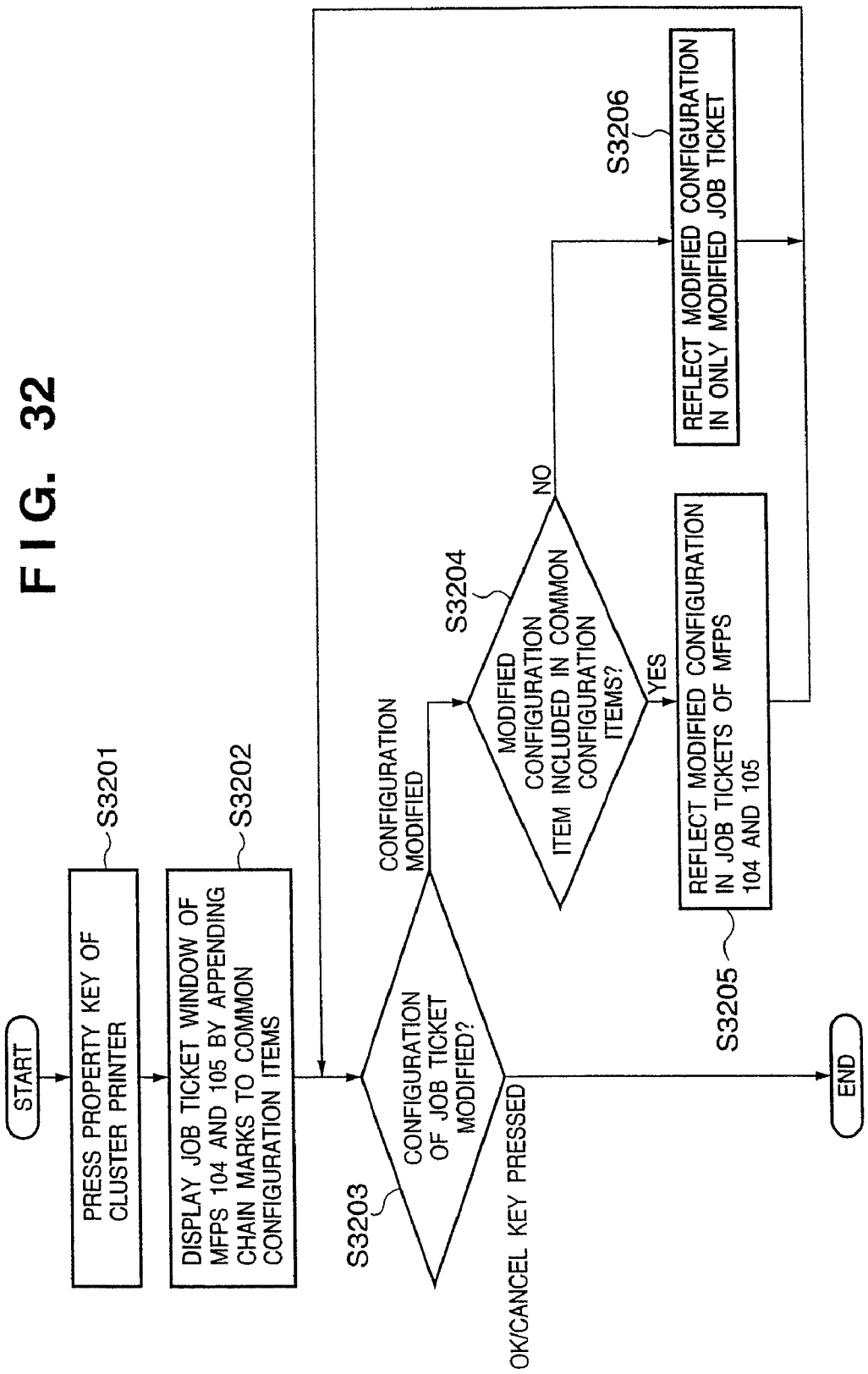
FIG. 32 is a flow chart showing the job ticket configuration operation upon implementing a cluster print process in the second embodiment.

The configuration sequence of a job ticket upon executing clustering print in this embodiment will be explained below mainly with reference to FIG. 32.

Figure 33:
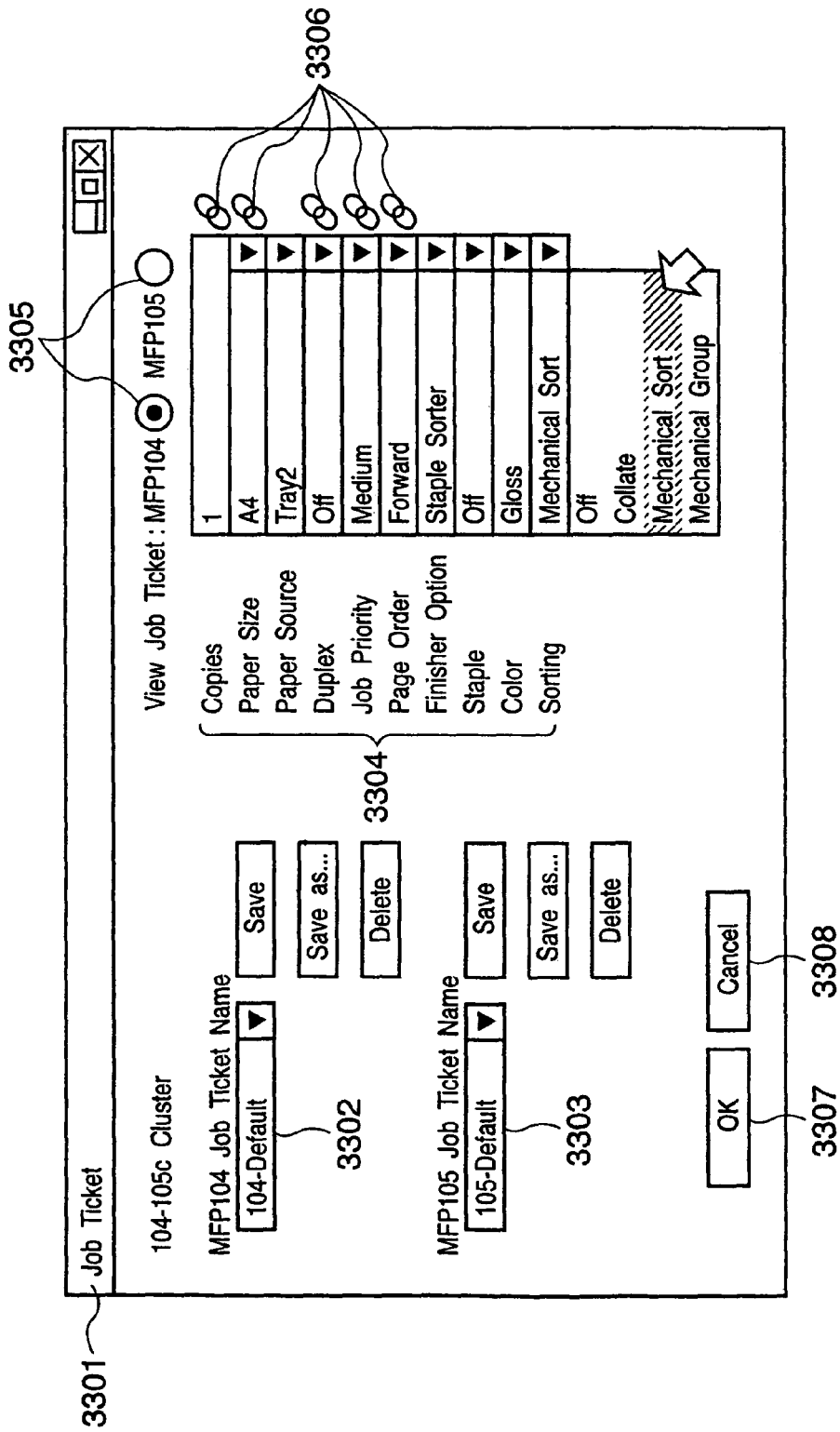
FIG. 33 shows an example of a job ticket window displayed on an MPF 104 upon implementing a cluster print process in the second embodiment.

If the user has selected a color/BW cluster printer from the display window 1901 of the printer driver or the display window 2001 of the job submitter on the document server 102 or client 103, and has clicked the property key 1907/2004 in step s3201, the flow advances to step S3202, and a job ticket select window 3301 of respective image forming apparatuses, i.e., the MFPs 104 and 105, which form the cluster logical printer, is displayed, as shown in FIG. 33.

Figure 34:
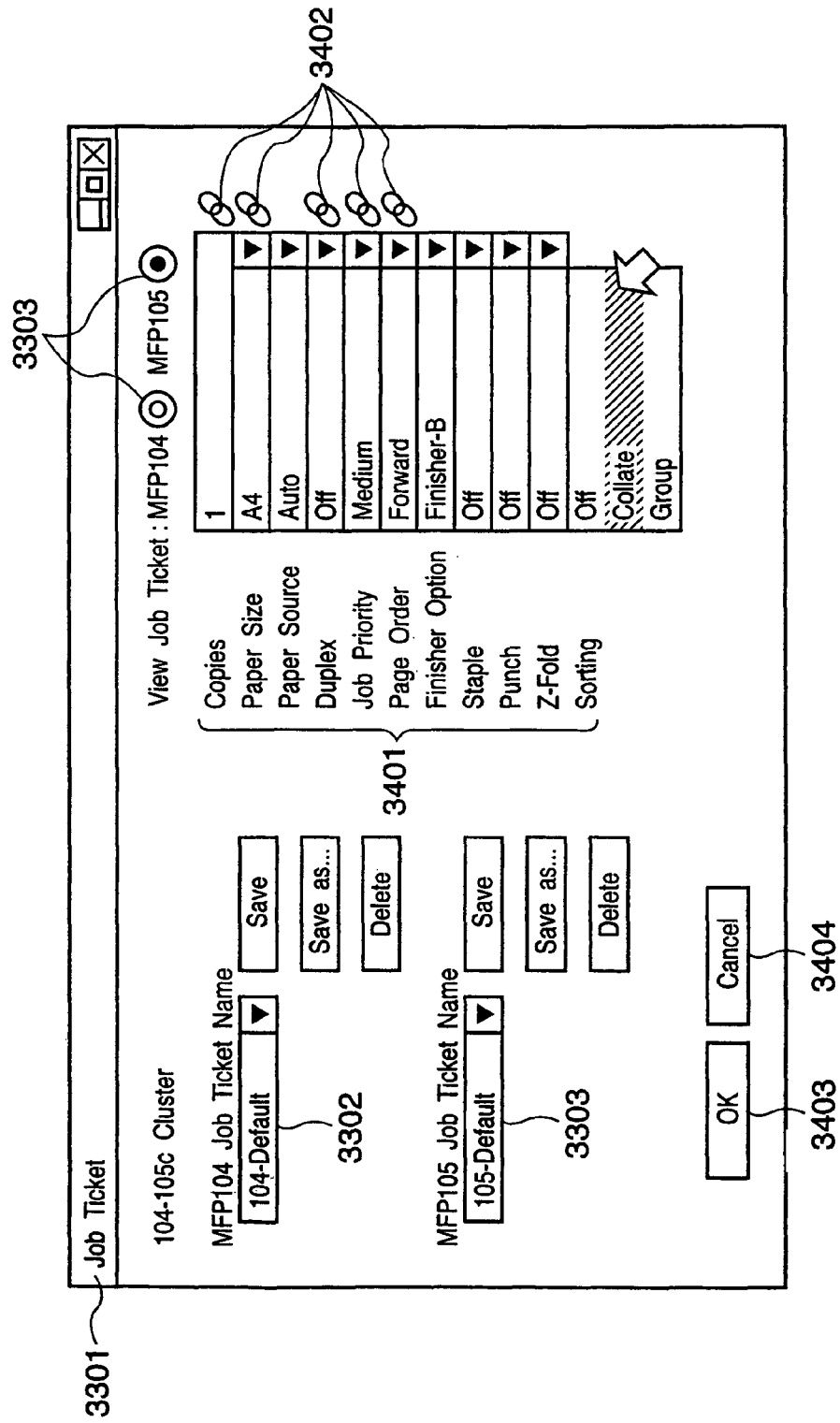
FIG. 34 shows an example of a job ticket window displayed on an MPF 105 upon implementing a cluster print process in the second embodiment.

This window displays job ticket names (3302 and 3303) of the MFPs 104 and 105. Also, configuration items 3304 of the job ticket of the MFP 104 are displayed, and the user can modify the configuration of the job ticket of the MFP 104. By manipulating a job ticket select key 3305, setup items 3401 of the MFP 105 are displayed, as shown in FIG. 34, and the user can modify the configuration of the job ticket of the MFP 105 (step S3203).

Furthermore, on this window, chain marks (3306 in FIG. 33, and 3402 in FIG. 34) are displayed in the neighborhood of some of the configuration items 3304 and 3401 of the MFPs 104 and 105. These marks indicate items which must be commonly configure in both the MFPs 104 and 105, and configurations for either the MFP 104 or 105 are reflected in conjunction with those for the other. Upon displaying chain marks, items of a job ticket for which chain marks are to be additionally displayed are determined on the basis of common configuration item information stored in the disk 1207 or RAM 1208 of the document server 102.

Note that the common configuration item information includes extracted items, which must be commonly configured in conjunction with each other upon making clustering print, of those of device unique information of an image forming apparatus that can be designated as a destination from the document server 102, as shown in FIG. 35. Note that the common configuration item information also holds information of values that respective items can commonly assume.

If the user has modified the configuration of the job ticket in step S3203, the document server 102 or client 103 checks in step S3204 if a configuration item of the common configuration item information has also been modified.

If it is determined in step S3204 that the configuration item of the common configuration item information has also been modified, the changed configuration item is reflected in the job tickets of both the MFPs 104 and 105 in step S3205.

On the other hand, if it is determined in step S3204 that no configuration item of the common configuration item information has been modified, the modified configuration item is reflected in only the job ticket corresponding to the MFP 104 or 105 in step S3206.

The processes in steps S3204 to S3206 are repeated until the user clicks an OK key (3307, 3403) or cancel key (3308, 3404) in step S3203 to end modification of the job ticket.

Since special indications (3306, 3402) are appended to configuration items included in the common configuration item information, the user can easily identify items that must or must not be configured in conjunction with those of another apparatus.

By contrast, when marks 3601 may be additionally displayed on configuration items, which are not included in the common configuration item information, on the job ticket window, as shown in FIG. 36, the user can easily identify items that must or must not be configured in conjunction with those of another apparatus.

As described above, according to this embodiment, when a single job is executed using a plurality of image forming apparatuses, since the user can easily identify items to be commonly configured of those to be configured in respective image forming apparatuses, he or she need not have knowledge of items to be commonly configured among respective image forming apparatuses, and can easily and reliably obtain a desired output result.

When an item to be commonly configured has been modified, since configurations for all image forming apparatuses which form a cluster printer are similarly modified in conjunction with each other, user's operations upon configuration can be facilitated, and a desired output can be obtained.

Other Embodiments

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

If the present invention is realized as a storage medium, program codes corresponding to the above mentioned flowcharts (FIGS. 24, 26, 30 and/or FIG. 32) are to be stored in the storage medium.

As many apparently widely different embodiments of the present invention can be made without departing from the spirit and scope thereof, it is to be understood that the invention is not limited to the specific embodiments thereof except as defined in the claims.

What is claimed is:

1. An information processing apparatus configured to communicate with a plurality of image forming apparatuses, comprising:

a selection unit configured to select a group of image forming apparatuses including a first image forming apparatus and a second image forming apparatus as an output destination;

a configuration display unit configured to display a configuration display image in which a plurality of items including both (a) a common item are included, wherein (a) the common item is an item to which print configuration information applied to both the first and the second image forming apparatus constituting the group is set and (b) the individual item is an item to which print configuration information applied to either one of the first image forming apparatus and the second image forming apparatus is set, such that a user can recognize the common item from the plurality of items, and a generation unit configured to generate a print job based on print configuration information set via the configuration display image displayed by said configuration display unit, wherein the configuration display unit switches to displaying a first configuration display image including (a) the common item and (b) the individual item to which print configuration information applied to the first image forming apparatus and not applied to the second image forming apparatus is set, and a second configuration display image including (a) the common item and (b) the individual item to which print configuration information applied to the second image forming apparatus and not applied to the first image forming apparatus is set, and wherein the print configuration information set in the common item in the first configuration display image is applied to the common item in the second configuration display image.

2. The information processing apparatus according to claim 1, wherein the configuration display unit displays a predetermined mark adjacent to (a) the common item in the configuration display image.

3. An information processing method for an information processing apparatus configured to communicate with a plurality of image forming apparatuses, comprising:

a selecting step of selecting a group of image forming apparatuses including a first image forming apparatus and a second image forming apparatus as an output destination;

a configuration display step of displaying a configuration display image in which a plurality of items including both (a) a common item are included, wherein (a) the common item is an item to which print configuration information applied to both the first and the second image forming apparatus constituting the group is set and (b) the individual item is an item to which print configuration information applied to either one of the first image forming apparatus and the second image forming apparatus is set, such that a user can recognize the common item from the plurality of items, and a generating step of generating a print job based on print configuration information set via the configuration display image displayed by the configuration display step, wherein the configuration display step switches to displaying a first configuration display image including (a) the common item and (b) the individual item to which print configuration information applied to the first image forming apparatus and not applied to the second image forming apparatus is set, and a second configuration display image including (a) the common item and (b) the individual item to which print configuration information applied to the second image forming apparatus and not applied to the first image forming apparatus is set, and wherein the print configuration information set in the common item in the first configuration display image is applied to the common item in the second configuration display image.

4. The information processing method according to claim 3, wherein the configuration display step displays a predetermined mark adjacent to (a) the common item in the configuration display image.

5. A non-transitory computer-readable storage medium that stores a computer executable program, which when executed by an information processing apparatus configured to perform a method to communicate with a plurality of image forming apparatuses, said method comprising:

a selecting step of selecting a group of image forming apparatuses including a first image forming apparatus and a second image forming apparatus as an output destination;

a configuration display step of displaying a configuration display image in which a plurality of items including both (a) a common item and (b) an individual item are included, wherein (a) the common item is an item to which print configuration information applied to both the first and the second image forming apparatus constituting the group is set and (b) the individual item is an item to which print configuration information applied to either one of the first image forming apparatus and the second image forming apparatus is set, such that a user can recognize the common item from the plurality of items, and a generating step of generating a print job based on print configuration information set via the configuration display image displayed by the configuration display step, wherein the configuration display step switches to displaying a first configuration display image including (a) the common item and (b) the individual item to which print configuration information applied to the first image forming apparatus and not applied to the second image forming apparatus is set, and a second configuration display image including (a) the common item and (b) the individual item to which print configuration information applied to the second image forming apparatus and not applied to the first image forming apparatus is set, and wherein the print configuration information set in the common item in the first configuration display image is applied to the common item in the second configuration display image.

6. The computer-readable storage medium according to claim 5, wherein the configuration display step displays a predetermined mark adjacent to (a) the common item in the configuration display image.

* * * * *